US008712825B1

(12) United States Patent
Holcombe et al.

(10) Patent No.: US 8,712,825 B1
(45) Date of Patent: Apr. 29, 2014

(54) WEB-BASED ROYALTY SYSTEM AND USER INTERFACE

(75) Inventors: Scott A. Holcombe, San Diego, CA (US); Robert H. Kohn, Carmel, CA (US); John Knott, El Cajon, CA (US); Ryan Daniels, San Diego, CA (US)

(73) Assignee: RoyaltyShare, Inc., San Diego, CA (US)

( * ) Notice: Subject to any disclaimer, the term of this patent is extended or adjusted under 35 U.S.C. 154(b) by 288 days.

(21) Appl. No.: 12/167,215

(22) Filed: Jul. 2, 2008

Related U.S. Application Data

(60) Provisional application No. 60/947,944, filed on Jul. 3, 2007.

(51) Int. Cl.
    G06Q 10/00  (2012.01)
    G06F 21/00  (2013.01)
    G06F 17/00  (2006.01)

(52) U.S. Cl.
    USPC ............... 705/7.35; 705/51; 705/59; 705/53; 705/400

(58) Field of Classification Search
    USPC ................... 705/400, 1, 1.1, 310, 59, 51
    See application file for complete search history.

(56) References Cited

U.S. PATENT DOCUMENTS

| 5,671,412 A | 9/1997 | Christiano |
| 6,189,146 B1 | 2/2001 | Misra et al. |
| 6,289,341 B1 | 9/2001 | Barney |
| 6,385,596 B1 | 5/2002 | Wiser et al. |
| 6,636,867 B2 | 10/2003 | Robertson |
| 6,772,196 B1 | 8/2004 | Kirsch et al. |
| 6,868,403 B1 | 3/2005 | Wiser et al. |
| 7,072,867 B2 * | 7/2006 | Dutta .......................... 705/53 |
| 2001/0018742 A1 | 8/2001 | Hirai |
| 2001/0047339 A1 | 11/2001 | Entani |
| 2001/0047515 A1 | 11/2001 | Schreer |
| 2002/0143565 A1 | 10/2002 | Headings et al. |
| 2003/0135369 A1 | 7/2003 | Stoimenov et al. |
| 2003/0182202 A1 | 9/2003 | Eason |
| 2003/0204698 A1 | 10/2003 | Sachedina et al. |
| 2004/0024688 A1 | 2/2004 | Bi et al. |
| 2004/0059641 A1 | 3/2004 | Brown et al. |
| 2004/0059644 A1 * | 3/2004 | Blau .......................... 705/26 |
| 2004/0093279 A1 | 5/2004 | Yamanoue et al. |
| 2004/0158871 A1 | 8/2004 | Jacobson |
| 2004/0172365 A1 | 9/2004 | Murakami et al. |

(Continued)

OTHER PUBLICATIONS http://www.archive.org/web/20050205144832/http://www.ascap.com/musicbiz/money-clauses.html.*

(Continued)

*Primary Examiner* — Michael Harrington
(74) *Attorney, Agent, or Firm* — John A. Smart

(57) ABSTRACT

Web-based royalty system and user interface is described. In one embodiment, for example, a Web-based royalty system of the present invention is described that comprises: an interface for receiving product information comprising products subject to royalties; an interface for receiving sales data comprising sales records for the products; an interface for receiving royalty terms for the products; a calculation engine for calculating royalties due for the sales data, by matching each sales record with a given product listed in the product information, and determining for each matched product royalties due based on royalty terms applicable to sales of that product; and a statement generator for generating royalty reports of the calculated royalties.

17 Claims, 36 Drawing Sheets

(56) References Cited

U.S. PATENT DOCUMENTS

| | | |
|---|---|---|
| 2004/0221295 A1 | 11/2004 | Kawai et al. |
| 2005/0021398 A1* | 1/2005 | McCleskey et al. ............ 705/14 |
| 2005/0138176 A1 | 6/2005 | Singh et al. |
| 2006/0015904 A1 | 1/2006 | Marcus |
| 2006/0059097 A1* | 3/2006 | Kent ............................... 705/57 |
| 2006/0167881 A1 | 7/2006 | Aydar et al. |
| 2006/0167882 A1 | 7/2006 | Aydar et al. |
| 2006/0294371 A1 | 12/2006 | Fanning |
| 2007/0156607 A1* | 7/2007 | Miloslavsky et al. ........... 705/77 |
| 2008/0071561 A1 | 3/2008 | Holcombe |
| 2008/0097920 A1 | 4/2008 | Aslani et al. |
| 2008/0126107 A1* | 5/2008 | Callerio ............................ 705/1 |
| 2008/0147558 A1* | 6/2008 | Kraus ............................. 705/59 |
| 2008/0181400 A1 | 7/2008 | Guleryuz et al. |
| 2008/0189155 A1 | 8/2008 | Miloslavsky et al. |
| 2008/0301058 A1 | 12/2008 | Campbell |
| 2008/0313664 A1 | 12/2008 | Benco et al. |
| 2009/0006225 A1 | 1/2009 | Multerer et al. |

OTHER PUBLICATIONS

Healey, Jon "Net Music Services in Royal Bing; Web: Online firms say publishers' demand for reproduction and performance royalties is holding up business." May 21, 2001, Los Angeles times, C:1.*

Taylor, Chris "Where the Money Goes: A breakdown of the $19.95 Sale Price of a CD." Nov. 1998, Canadian Musician, 20, p. 65.*

* cited by examiner

| Tracks | | | | |
|---|---|---|---|---|
| Track | Name | Length | Artist | Pay Mechanicals? | Edit |
| ▷ 01 | T. McGovern / Beam Me Up, Scotty | 00:00 | Dr. Demento | No | |
| ▷ 02 | The Firm / Star Trekkin' | 00:00 | Dr. Demento | No | |
| ▷ 03 | Weird Al Yankovic / The Saga Begins | 00:00 | Dr. Demento | Yes | |
| ▷ 04 | Bobby Pickett / Stardrek | 00:00 | Dr. Demento | No | |
| ▷ 05 | Rusty Humphries / Do The Picard | 00:00 | Dr. Demento | No | |
| ▷ 06 | Leslie Fish / Carmen Miranda's Ghost | 00:00 | Dr. Demento | No | |
| ▷ 07 | Boots Walker / They're Here | 00:00 | Dr. Demento | Yes | |
| ▷ 08 | Leslie Fish / Banned From Argo | 00:00 | Dr. Demento | No | |
| ▷ 09 | Leonard Nimoy / Twinkle Twinkle Little Earth | 00:00 | Dr. Demento | Yes | |
| ▷ 10 | Billy Murray / The Ballad of William Robinson | 00:00 | Dr. Demento | Yes | |
| ▷ 11 | Luke Sienkowski / What's Up Spock | 00:00 | Dr. Demento | No | |
| ▷ 12 | Congress of Wonders / Star Trp | 00:00 | Dr. Demento | Yes | |

Add Track

Mechanical Royalty Statement

From

Period Ending 09/30/2006

Bil Maney Publishing
2115 Laurel Pass Ave
Los Angeles, CA 90046-1401
US

Phone: 323-650-0800

| | Amount | Check # | Date | Memo |
|---|---|---|---|---|
| Previous Period Balance: | $0.00 | | | |
| Current Period Royalties: | $16.96 | | | |
| Ending Balance: | $16.96 | | | |
| Minimum Payment: | $0.00 | | | |
| Amount Payable: | $16.96 | | | |

Current Period Details:

| Track Title | Album Title | UPC | Product Config | Rate Period | Share | Yr. Rate | Net Units | Amount Due |
|---|---|---|---|---|---|---|---|---|
| The Salad of Wilson Robinson | D. Derrenda's His F... | 80:2911:3727 | CD | 2006-2007 | 100% | .1400 | 70 | $2.80 |
| The Salad of Wilson Robinson | D. Derrenda's His F... | 80:2911:3727 | DT | 2006-2007 | 100% | .1400 | 109 | $8.16 |
| The Salad of Wilson Robinson | D. Derrenda's His F... | 80:2911:3727 | R | 2006-2007 | 100% | .1400 | 39 | $1.56 |
| The Salad of Wilson Robinson | D. Derrenda's His F | 80:2911:4220 | CD | 2006-2007 | 100% | .1400 | 106 | $4.24 |
| | | | | | Track Subtotal: | | | $16.96 |
| | | | | Total: | | | | $16.96 |

WEB-BASED ROYALTY SYSTEM AND USER INTERFACE

CROSS REFERENCE TO RELATED APPLICATIONS

The present application is related to and claims the benefit of priority of the following commonly-owned, presently-pending provisional application(s): application Ser. No. 60/947,944, filed Jul. 3, 2007, entitled "Web-based Royalty System and User Interface", of which the present application is a non-provisional application thereof. The disclosure(s) of each of the foregoing application(s) are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 82750 Bytes, created: Jul. 2, 2008 1:22:40 PM; Object ID: File No. 1; Object Contents; Source code.

BACKGROUND OF INVENTION

1. Field of the Invention

The present invention relates generally to managing digital media assets and, more specifically, to Web-based services and user interface for processing and reporting royalties for media assets.

2. Description of the Background Art

Traditionally, consumers have purchased music by buying physical media at retail music stores. After browsing compact discs (CDs) or cassette tapes of interest, the consumer proceeds to a checkout register to pay for the music being purchased. In recent years, however, the Internet has popularized the electronic purchase and delivery of music to consumers. Efficient file formats, such as MP3, have made the size of digital media assets (i.e., media files) small enough to make their download via the Internet not only practical but highly advantageous.

Today, consumers purchase music from online media services or "music stores," including for example Apple iTunes, EMusic, Rhapsody, Napster, Yahoo Music, MSN Music, and MusicMatch, to name a few. Using an online music store, consumers may purchase music either as individual music tracks or in albums of songs, for direct download to one's own computer. When a consumer desires to acquire (e.g., purchase or rent) a media content item (e.g., a digital music file, digital video file, electronic book (e-book) file, or other digital media), the consumer uses a Web-enabled device (e.g., Internet-connected personal computer or cell phone) to communicate with the online service. The service enables the consumer to browse and search for a desired media content item, and download purchased items to the consumer's device. Once stored on the consumer's own device, items can be "played" (i.e., rendered).

Each online music store provides music management software that gives the consumer the ability to organize their music into playlists, convert music into a different (e.g., MP3, AIFF, WAV, AAC, and the like), and transfer music between the personal computer and a portable music player (e.g., MP3 player). Although the digitization of media content was first popularized with music, practically all other media assets—including movies, music videos, educational content, television shows, live events, advertising, literary works, and the like—have been digitized to allow content suppliers to derive revenues from these assets in a digital marketplace.

Downloaded media files themselves are typically protected by Digital Rights Management (DRM) encoding, such as Apple Computer's FairPlay encoding, which prevents the playback of purchased media files on unauthorized media players. However, consumer access to media content may be controlled by a variety of methods, depending on the needs of the media service and content owners. Rhapsody, for example, offers a subscription plan that allows users unlimited media streaming and burning to CD. This flexibility, which stems from the digital nature of the media assets, supports a variety of different business models, providing convenience to consumers and increased revenue for content owners and suppliers.

Notwithstanding the obvious benefits of the digital distribution of media content, content owners and suppliers themselves are ill equipped to track and manage associated royalty obligations. Consider the following problem. Each online service must generate quarterly royalty statements for hundreds (or even thousands) of record labels ("Labels") and thousands of music publishers. With the explosion of digital music, the music industry now faces an urgent problem: how do record companies and music publishers accurately report royalties owed to recording artists and songwriters. The problem has become particularly acute because of the shift from distributing music in physical form to digital download, resulting in the generation of hundreds of millions of transactions by online music services. This has become a massive data processing problem that is posing critical accounting challenges for the Labels and music publishers.

Given increasing consumer demand for digital media content and features, online purchase and distribution of all sorts of media content can only be expected to increase. This trend is coupled with a need for an easy-to-use, Web-based services and user interface for royalty processing and reporting for content providers and the entertainment industry. The present invention fulfills this and other needs.

SUMMARY OF INVENTION

Web-based royalty system and user interface is described. In one embodiment, for example, a Web-based royalty system of the present invention is described that comprises: an interface for receiving product information comprising products subject to royalties; an interface for receiving sales data comprising sales records for the products; an interface for receiving royalty terms for the products; a calculation engine for calculating royalties due for the sales data, by matching each sales record with a given product listed in the product information, and determining for each matched product royalties due based on royalty terms applicable to sales of that product; and a statement generator for generating royalty reports of the calculated royalties.

In another embodiment, for example, a computer-implemented method of the present invention is described for determining royalties due on sales of royalty-bearing products, the method comprises steps of: (a) storing product information characterizing the products, sales records for the products, and contracts for the products, wherein each contract comprises contract terms governing royalty payments, and at least some of the contract terms are prioritized based on attributes of the product; (b) for a given sales record, determining royalties due by: determining a particular product that the given sales record pertains to, determining all contracts associated with the particular product, and based on attributes of the particular product, calculating applicable royalties by applying the attributes of the particular product against the prioritized contract terms of all contracts associated with the particular product; and (c) repeating step (b) for all remaining sales records, thereby determining the royalties due on sales of the products.

In yet another embodiment, for example, a computer-implemented method of the present invention is described for determining royalties for an album having at least some tracks subject to a license having a controlled composition clause, the method comprises steps of: based on the controlled composition clause, establishing a royalty pool equal to an upper limit of royalties payable under the clause; determining whether any of the tracks on the album are not subject to the controlled composition clause; decreasing the royalty pool by an amount equal to royalties that must be paid for any tracks on the album that are not subject to the controlled composition clause; and for the remaining tracks that are subject to the controlled composition clause, determining a per track royalty based on the royalty pool remaining divided by the number of remaining tracks.

BRIEF DESCRIPTION OF DRAWINGS

FIG. 4E is a bitmap screen shot illustrating the Catalog page displaying an album view (bottom portion).

FIG. 4G is a bitmap screen shot illustrating remaining sections of the View Album page.

FIG. 5A is a bitmap screen shot illustrating the user selecting ("clicking") the track #, "Billy Mumy/The Ballad of William Robinson."

FIG. 5E is a bitmap screen shot illustrating that in the Source input field the user can easily select the Source of revenue from a pulldown list.

FIG. 5F is a bitmap screen shot illustrating that the user can easily specify the Channel of distribution (e.g., All, Retail, Military, Club, etc.) from a pulldown list.

FIG. 5G is a bitmap screen shot illustrating that the user can easily specify the Price (e.g., All, Full, Mid, Discount, Budget, etc.) from a pulldown list.

FIG. 5H is a bitmap screen shot illustrating that the user can specify the Rate from edit field.

FIG. 5I is a bitmap screen shot illustrating that applicable deductions and discounts (e.g., Rate Reduction, Percentage of Sales, Packaging, Free Goods, etc.) may be entered in the discount edit fields.

FIG. 5J is a bitmap screen shot illustrating that the user may continue adding additional contract terms (as many as desired) by the clicking "Add Another Term", whereupon a new row is added for receiving additional contract terms.

FIG. 7A is a bitmap screen shot illustrating a Product Entry page.

FIG. 7B is a bitmap screen shot illustrating that the user can specify that the track is Included, Bonus, or Not Included.

FIG. 8A is a bitmap screen shot illustrating a Track Entry page 800.

FIG. 9A is a bitmap screen shot illustrating that for the View Album page (e.g., shown in FIG. 4F), the bottom portion of the page includes a Track Licenses (mechanicals) section.

FIG. 9B is a bitmap screen shot illustrating that to add a license, the user clicks the Add License button.

FIG. 9E is a bitmap screen shot illustrating that upon the user clicking the Edit Clause button, the system displays a Controlled Composition Clause edit page.

FIG. 9G is a bitmap screen shot illustrating a License Entry page.

FIG. 10A is a bitmap screen shot illustrating a sample list of statements for mechanicals.

FIG. 10C is a bitmap screen shot illustrating generation of a higher-level (less-detailed) statement.

FIG. 10D is a bitmap screen shot illustrating a sample statement for the Harry Fox Agency, which represents a number of publishers.

FIG. 10 E is a bitmap screen shot illustrating that upon the user clicking Songs of Universal, the system displays the corresponding detailed view shown in FIG. 10E.

DETAILED DESCRIPTION

Glossary

Figure 1:
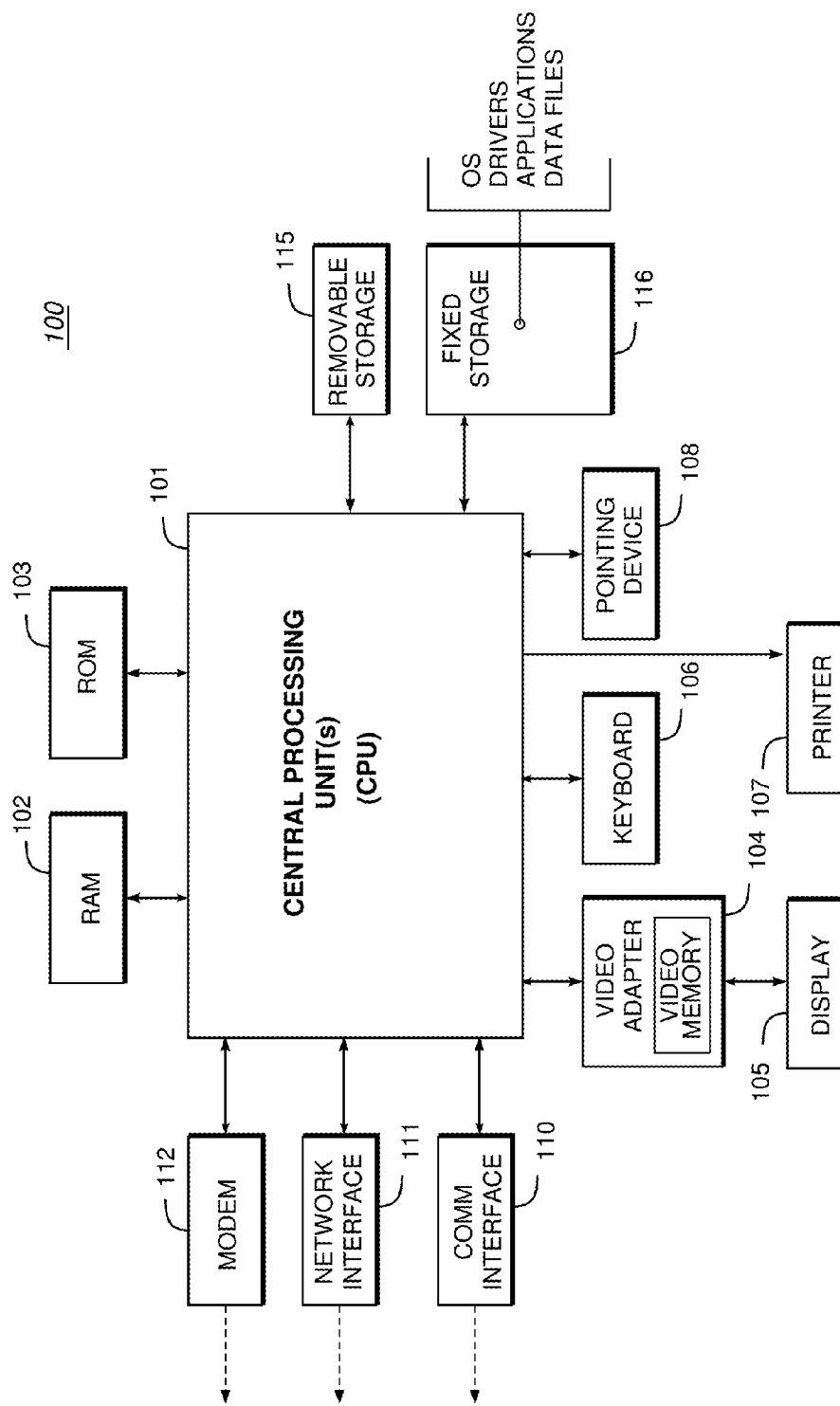
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Administrator ("admin"): An individual responsible for maintaining a multi-user computer system, including a local-area network (LAN). Typical duties include adding and configuring new workstations; setting up user accounts; installing system-wide software; and allocating storage space.

ISRC: Abbreviation for International Standard Recording Code, which is the international identification system for sound recordings and music videorecordings. Each ISRC is a unique and permanent identifier for a specific recording that can be permanently encoded into a product as its digital fingerprint. Encoded ISRC provide the means to automatically identify recordings for royalty payments.

Label (Record Label): Shorthand used to refer to a content owner, such as a Record Label (e.g., EMI).

MD5: A message-digest algorithm that takes as input a message of arbitrary length and produces as output a 128-bit "fingerprint" or "message digest" of the input. Further description of MD5 is available in "RFC 1321: The MD5 Message-Digest Algorithm", (April 1992), the disclosure of which is hereby incorporated by reference. A copy of RFC 1321 is available via the Internet (e.g., currently at www.ietf.org/rfc/rfc1321.txt).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Perl: Short for Practical Extraction and Report Language, Perl is a programming language developed by Larry Wall, especially designed for processing text. Because of its strong text processing abilities, Perl has become one of the most popular languages for writing CGI scripts.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

UPC: Stands for Universal Product Code, which is one of a wide variety of bar code languages called symbologies. The UPC was the original barcode widely used in the United States and Canada for items in stores.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

INTRODUCTION

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "pointand-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers running Web browsers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

View Components and User Interface

Figure 2:
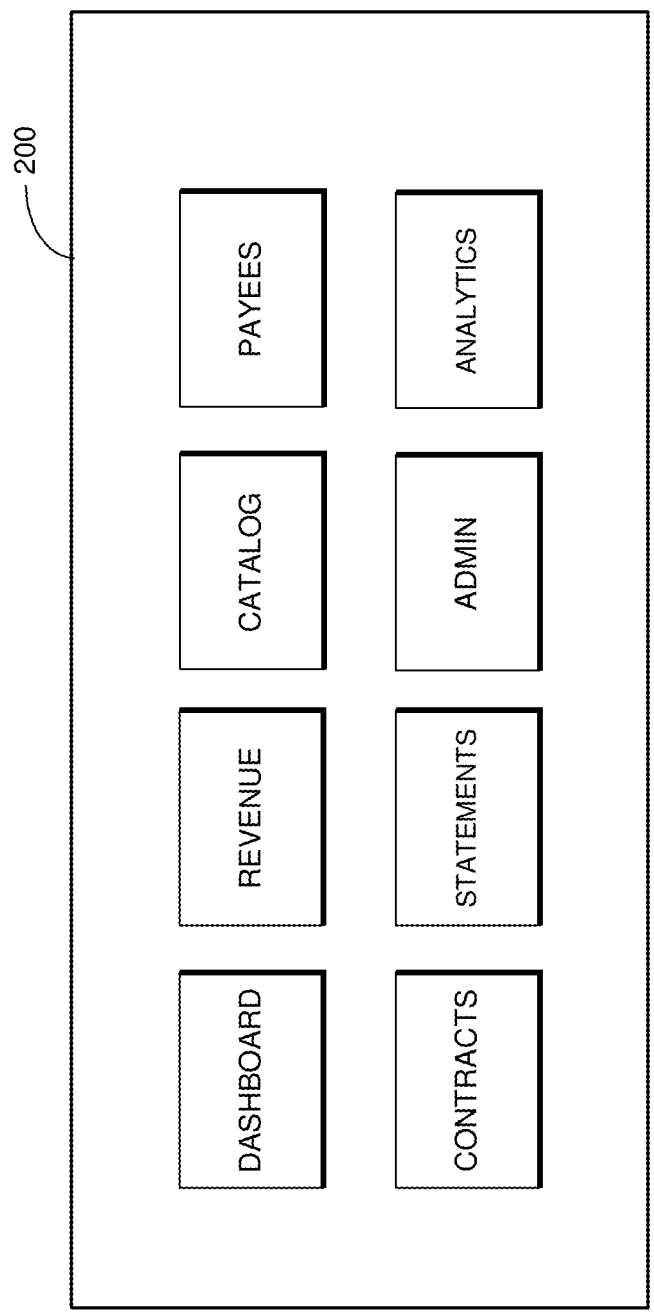
FIG. 2 is a high-level block diagram of the user interface "view" components or modules.
Figure 3:
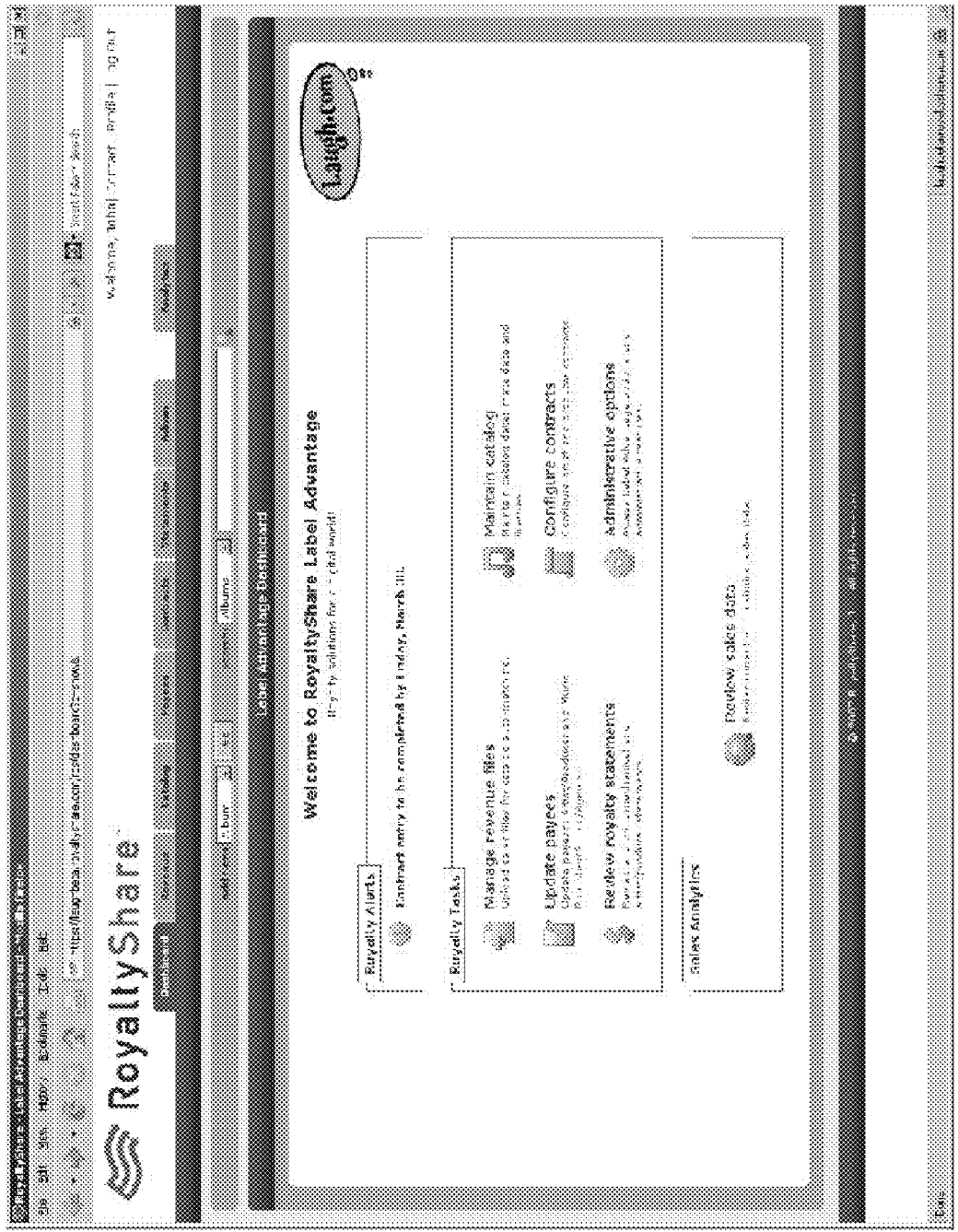
FIG. 3 is a bitmap screen shot illustrating an opening or "welcome" screen, which provides tabbed access to each of the views listed in FIG. 2.

FIG. 2 is a high-level block diagram of the user interface "view" components or modules. As shown, user interface 200 includes a Web browser supporting DASHBOARD, REVENUE, CATALOG, PAYEES, CONTRACTS, STATEMENTS, and ADMIN views. FIG. 3 is a bitmap screen shot illustrating an opening or "welcome" screen, which provides tabbed access to each of the views listed in FIG. 2. Operation of user interface 200 will now be described in detail.

Figure 4A:
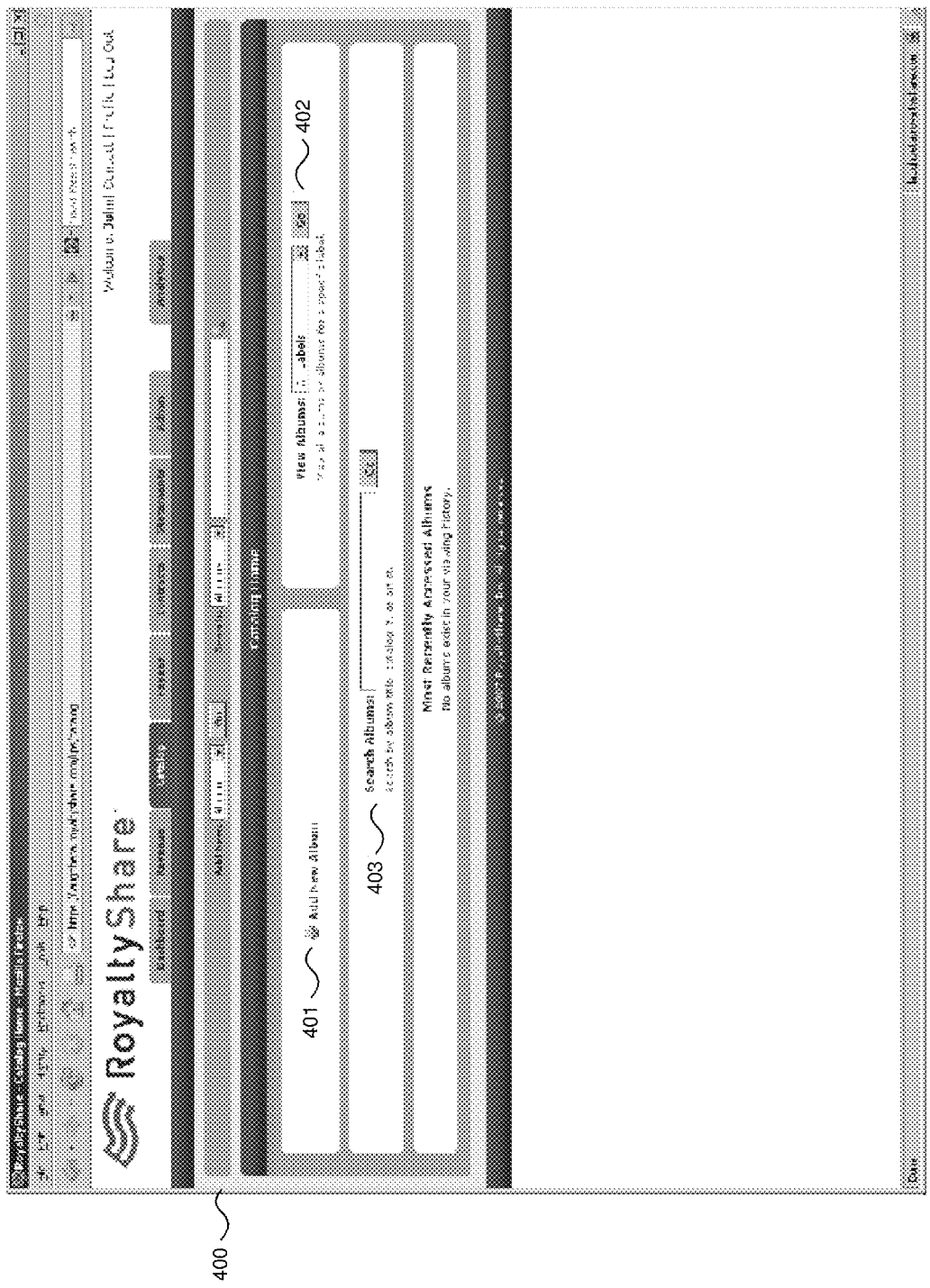
FIG. 4A is a bitmap screen shot of a Catalog page.
Figure 4B:
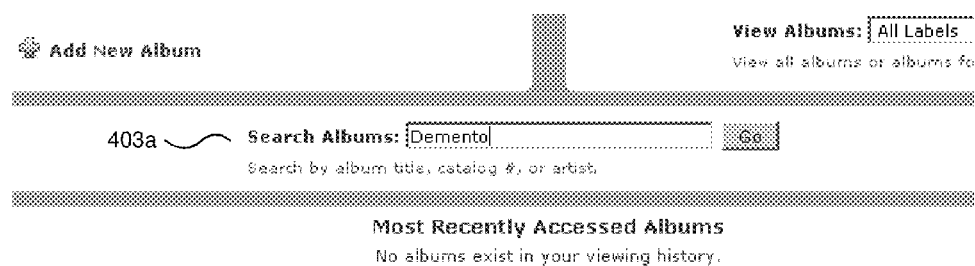
FIG. 4B is a bitmap screen shot illustrating the inputting of search criteria (e.g., "Demento").
Figure 4C:
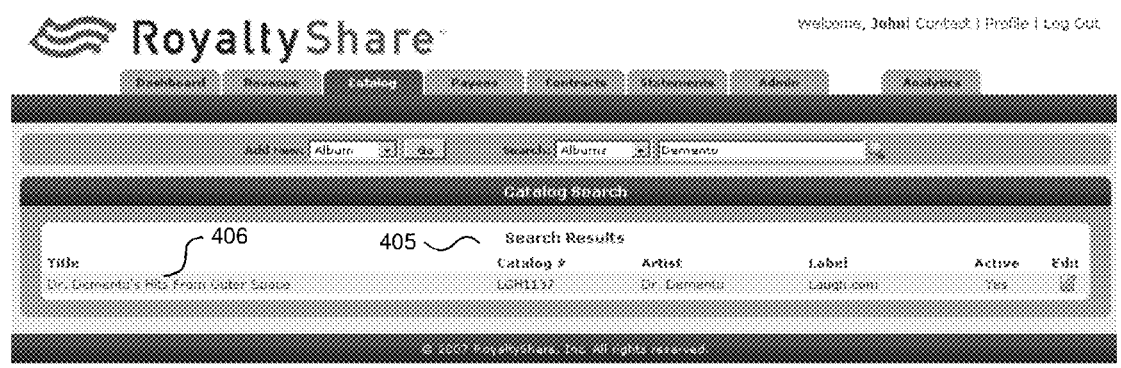
FIG. 4C is a bitmap screen shot illustrating Catalog Search results.

FIG. 4A is a bitmap screen shot of a Catalog page 400. As shown, the Catalog page 400 includes user input elements to Add New Album 401, View Albums 402, and Search Albums 403. Upon inputting search criteria (e.g., "Demento"), as shown at 403a in FIG. 4B, the Catalog page displays Catalog Search results 405, as shown in FIG. 4C. Upon the user selecting (e.g., clicking) a search result (Album), such as "Dr. Demento's Hits From Outer Space" shown at 406, the Catalog page now displays an album view, "View Album," the top portion of which is shown at 410a in FIG. 4D and the bottom portion of which is shown at 410b in FIG. 4E. The "View Album" view provides detailed insight into a given album, including relationships that previously had not been presented in an automated format.

Figure 4D:
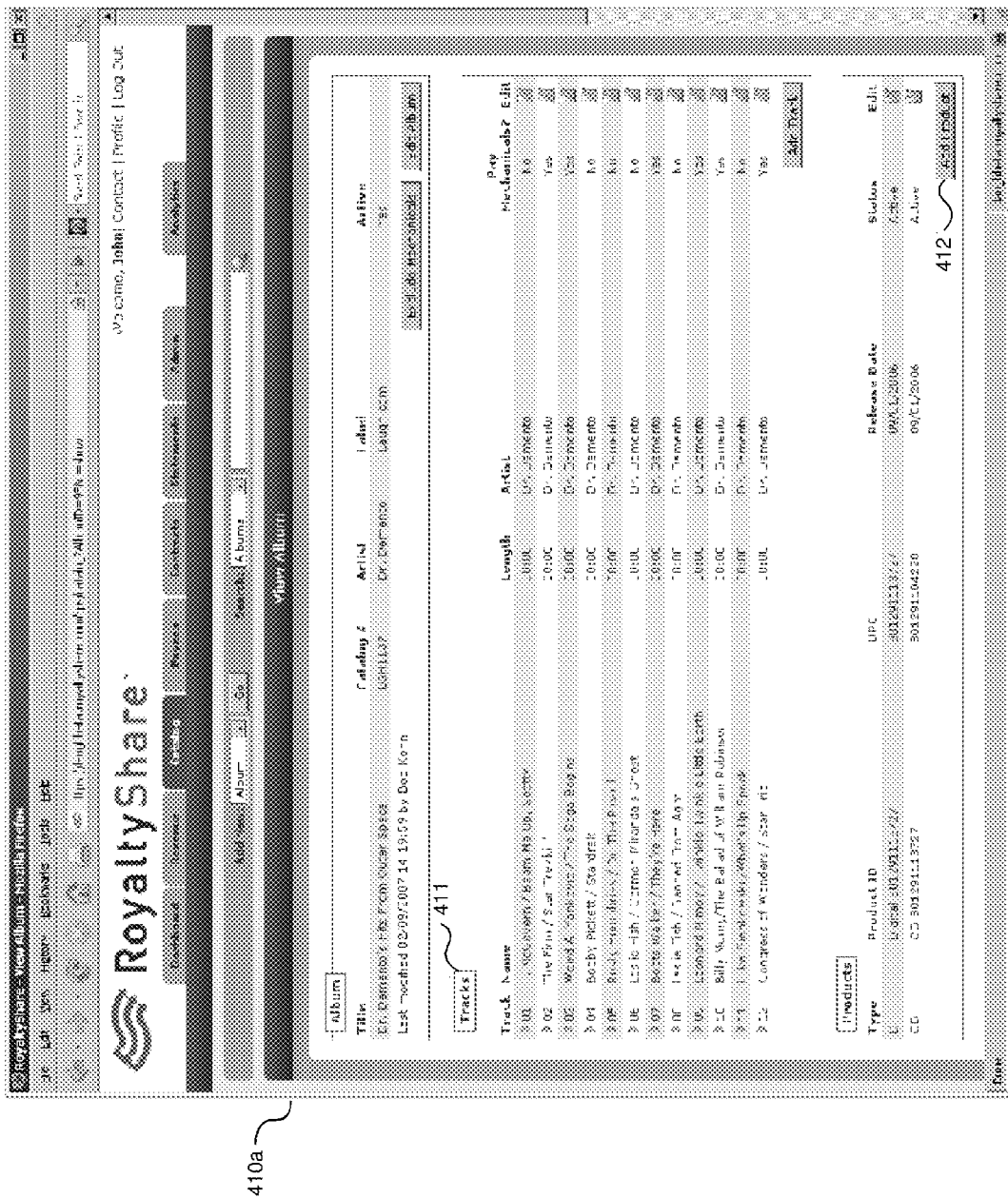
FIG. 4D is a bitmap screen shot illustrating the Catalog page displaying an album view (top portion).
Figure 4E:
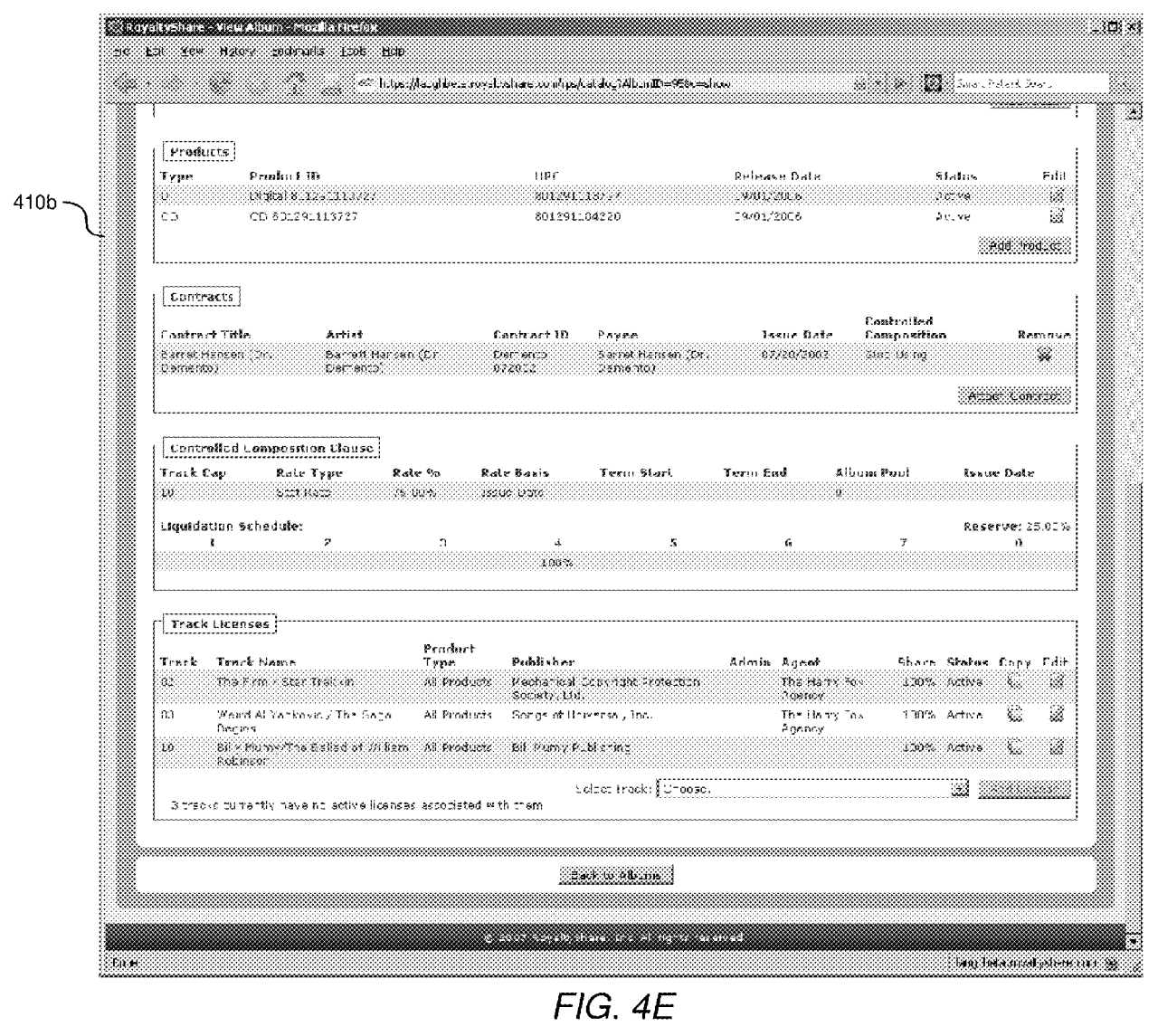
Figure 4F:
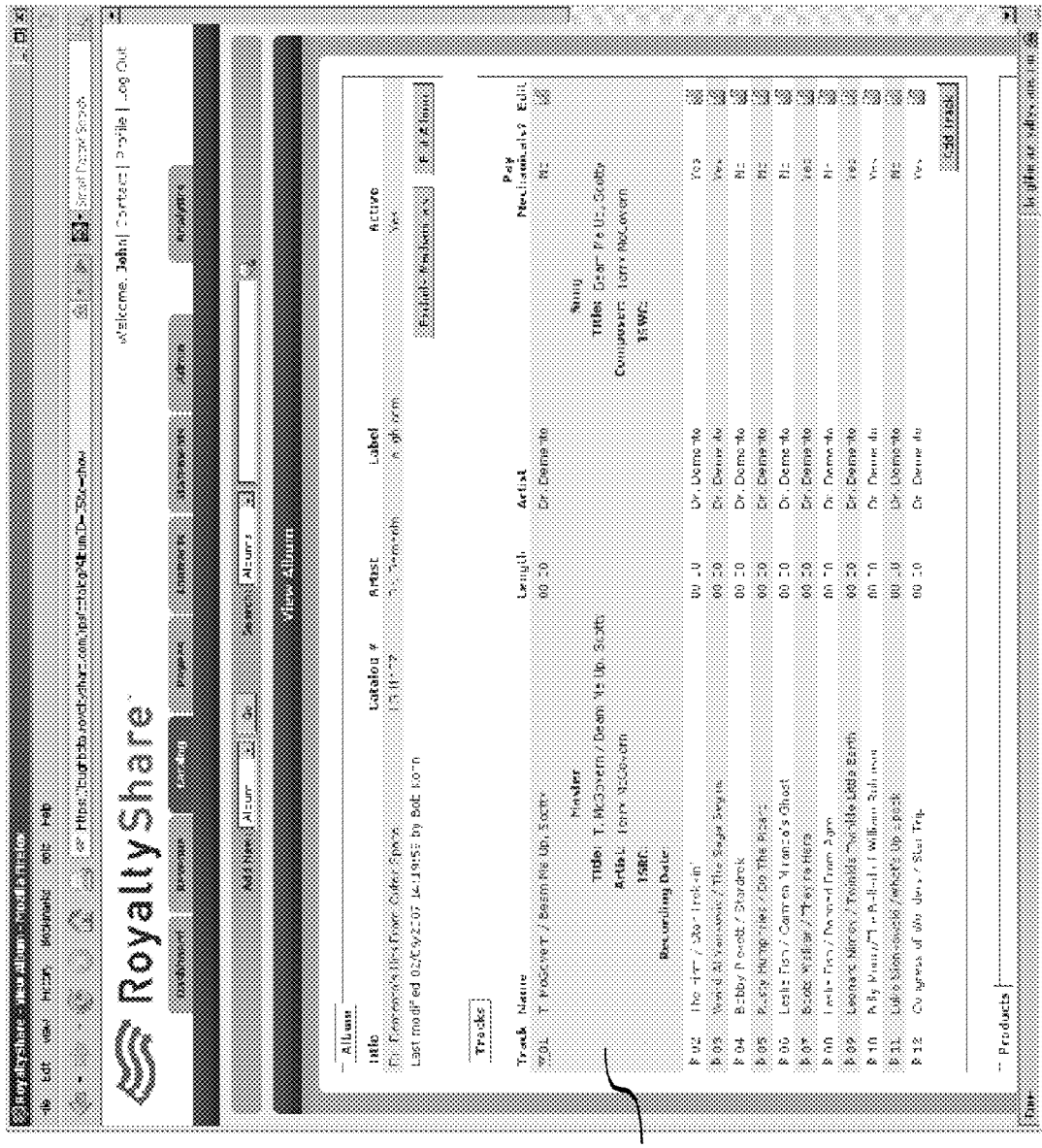
FIG. 4F is a bitmap screen shot illustrating an expanded track view.
Figure 4G:
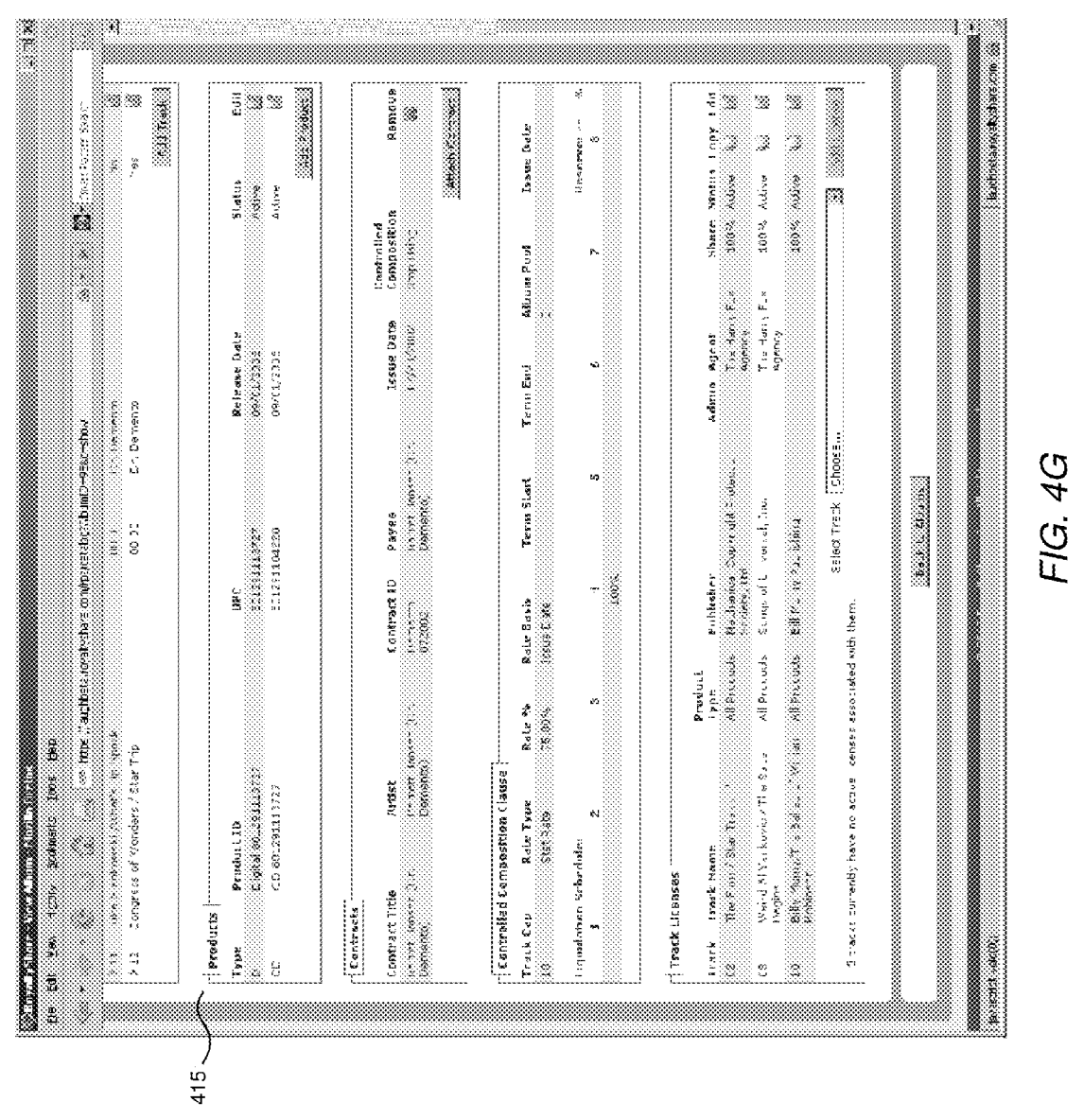

In order to understand the features of the "View Album" page or view, it is helpful to first review some of the terminology used in the industry to describe music content, licensing, and distribution. "Album" refers to a collection of tracks. In the album view, tracks are listed in a Tracks section 411 (FIG. 4D). Upon the user clicking expand/collapse arrow for a given track (e.g., Track 01, "Beam Me Up, Scotty"), the album view shows an expanded track view 412 (FIG. 4F). The expanded track view shows the detailed information for a given track, including Master Recording details comprising Title, Artist, ISRC code, Recording Date, and Song details comprising Song Title, Composer, and ISWC code. The expanded track view may be collapsed back to normal view, by the user clicking on the expand/collapse arrow. The left side of expanded track view 412 presents "Master" data, and the right side presents "Song" data. With music tracks, the song is very often licensed from a third party (e.g., music publisher). The master, on the other hand, is the sound recording itself (i.e., copyrighted sound recording), which is typically owned by the record label under contractual terms agreed to with the recording artist. FIG. 4G shows remaining sections of the View Album page. Products section 415 lists the different products (e.g., CD, Digital Album, etc.) that the album may be sold as. Product-specific information (e.g., included tracks, etc.) are accessible from the Products section 415 (e.g., by clicking on the particular product of interest). In this manner, all of the information related to an album (e.g., products configurations, contract terms, etc.) is accessible to the user in a single location for providing the user with control over content management.

Billing support and royalty obligations are automatically tabulated by the interface, based on the associated Contract, License and Product data (which is automatically included by the interface, based on the user's selections).

Figure 4H:
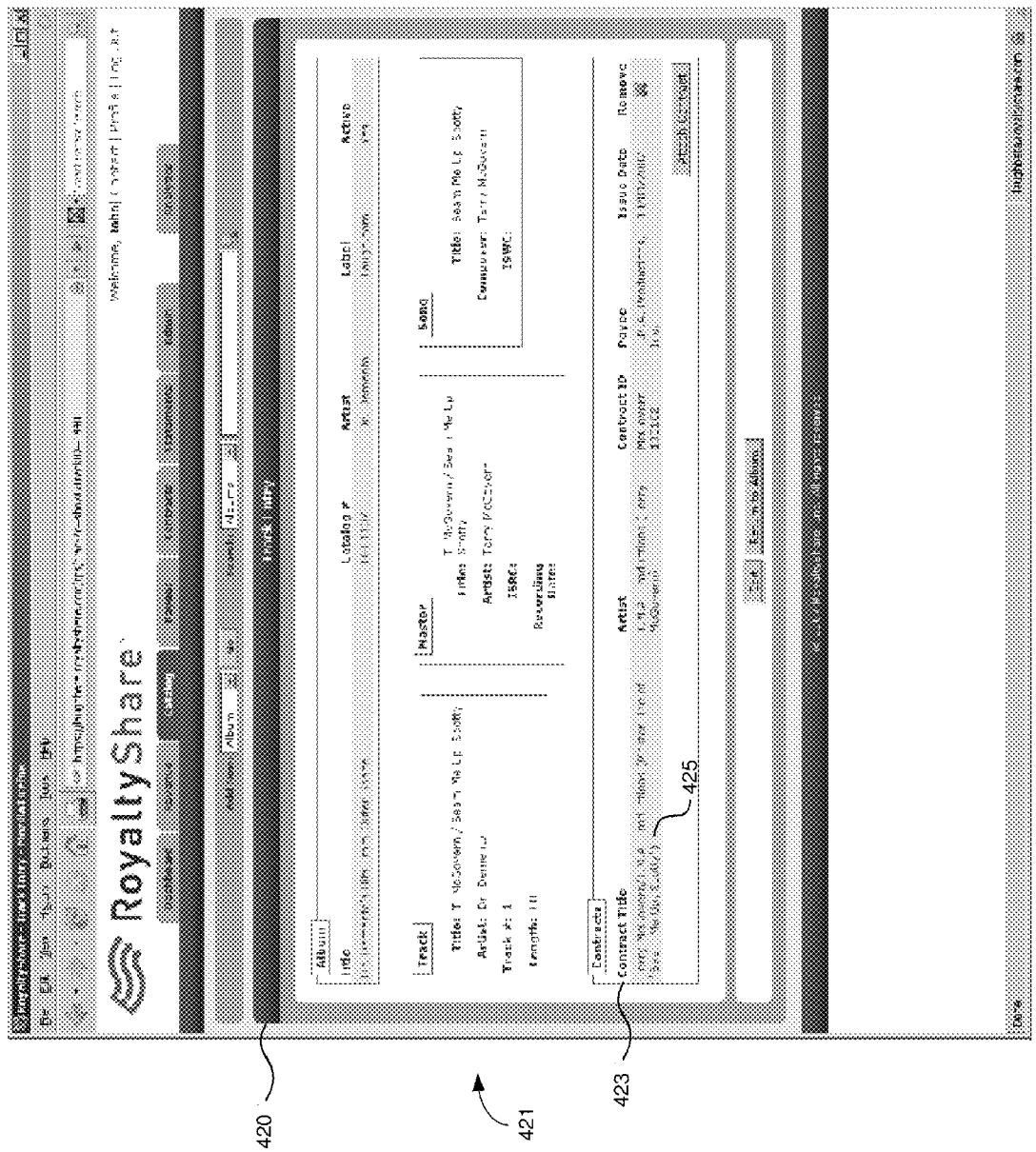
FIG. 4H is a bitmap screen shot illustrating the interaction of licensing an individual track.
Figure 4I:
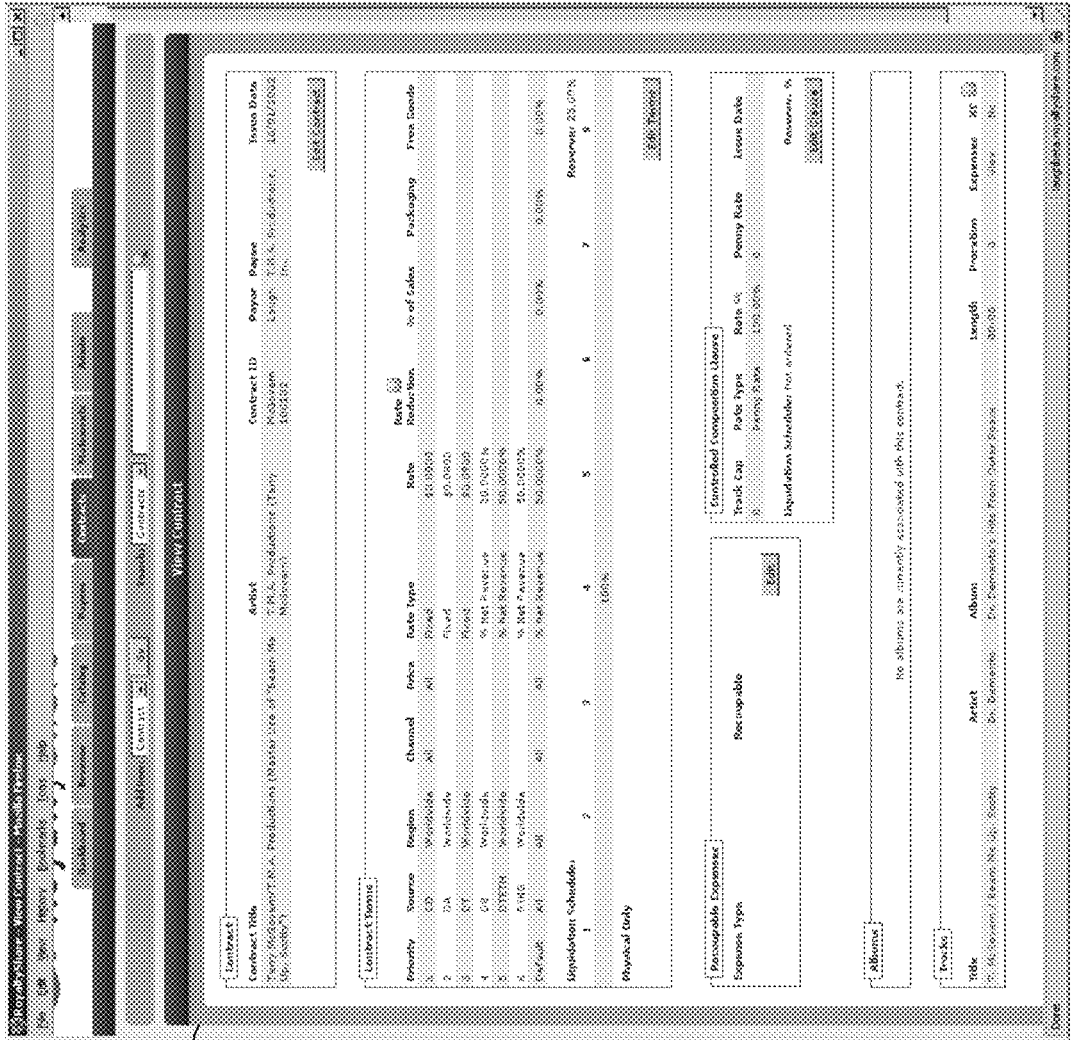
FIG. 4I is a bitmap screen shot illustrating a View Contract page.

The on-demand contract information greatly facilitates distribution of media content. FIG. 4H illustrates the interaction of licensing an individual track. Upon the user clicking on the track title (e.g., "T. McGovern/Beam Me Up, Scotty"), the interface displays a Track Entry view 420, which includes the list of underlying contracts associated with the just-selected track. The Track, Master, and Song details are shown at 421. Here, the Track indicates the specific Master Recording that was used on the album, specifically via the ISRC (International Standard Recording Code). It also identifies the specific Song that was used, as indicated by the composer and ISWC (International Standard Musical Work Code). Significantly, the Track Entry view 420 includes Contract information 423, as shown. Upon the user clicking on the contract title (at 425), the interface displays a View Contract page 430, as shown in FIG. 4I. This information indicates the terms by which sales for the track should be paid, allowing royalty obligations for the individual track to be immediately determined. For example, the terms might indicate that sales of Compact Discs in the United States through normal retail channels will be paid at 10% of suggested retail price on a per unit basis, while Digital product sales will be paid at a flat 12% of net revenue received. Sales can be broken down by product configuration, territory, sales channel and price level with differing royalty rates and terms based on each. If desired, royalty reserves can be specified in anticipation of expected product returns at retail outlets. Since returns rarely occur with digital goods, the user must specifically specify if they wish to hold reserves on digital sales.

Figure 4J:
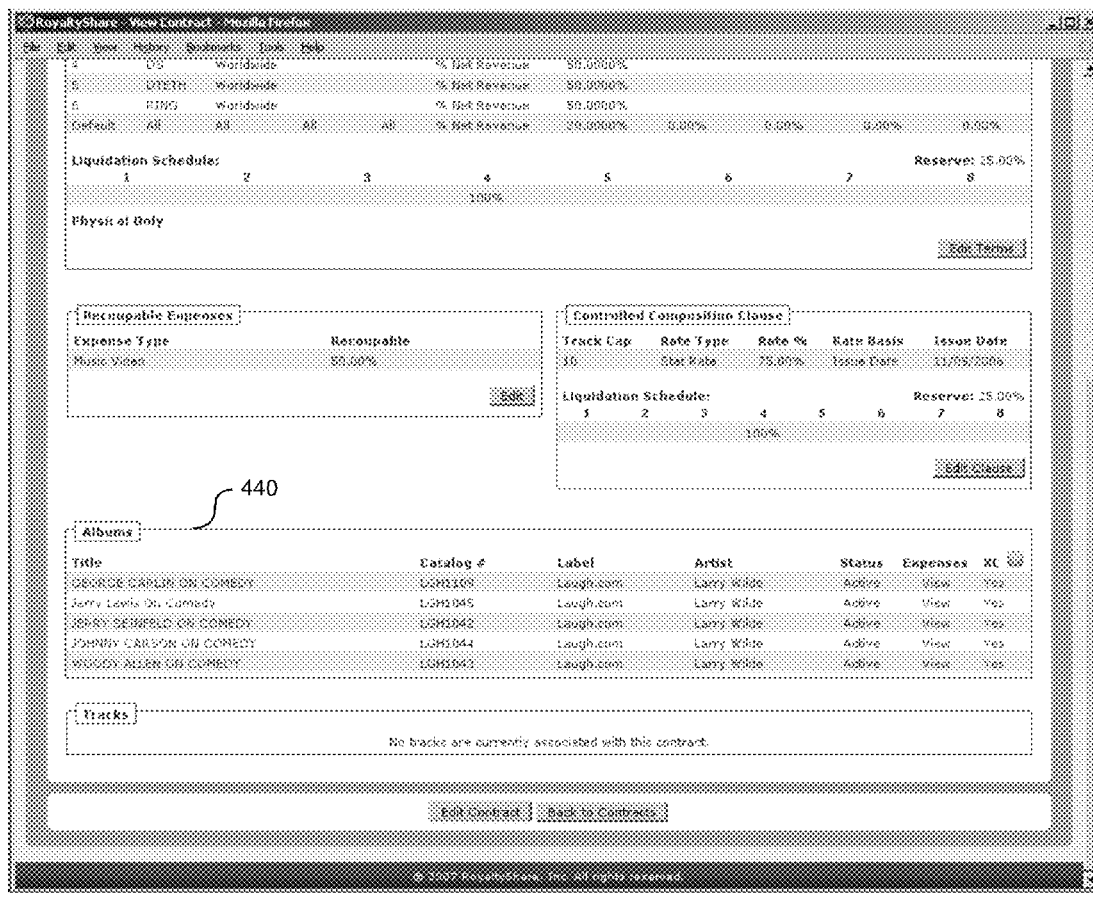
FIG. 4J is a bitmap screen shot illustrating the bottom portion of the View Contract page, which lists in Albums section the albums that the currently-viewed contract is attached.

As shown in FIG. 4J, the bottom portion of the View Contract page 430 lists in Albums section 440 the albums that the currently-viewed contract is attached (i.e., applicable to). This is in addition to any track attachments. By including the contract information and royalty information in one place, it makes it much easier for a content owner to understand the relationships between products, sales and their royalty obligations.

Figure 5B:
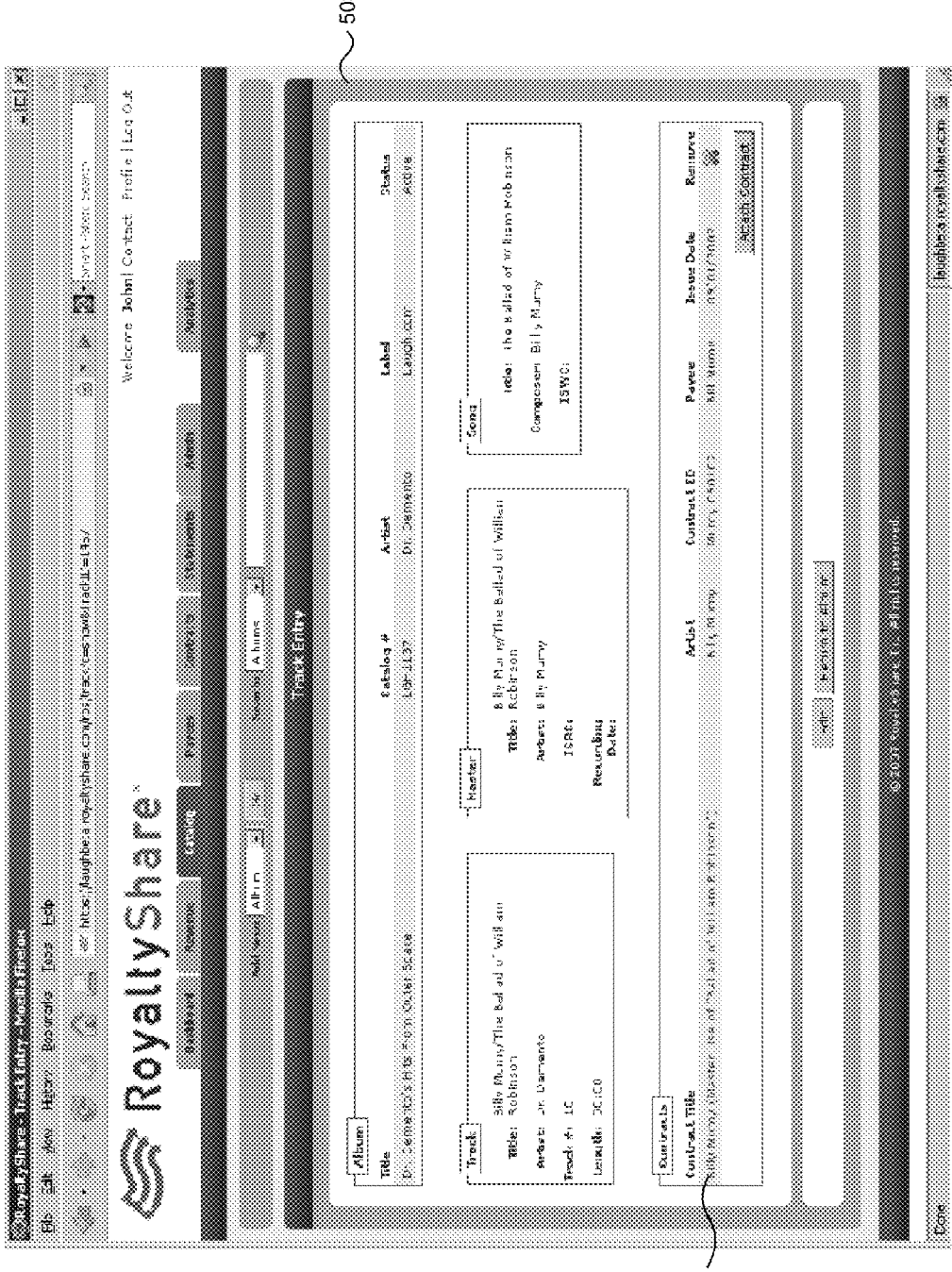
FIG. 5B is a bitmap screen shot illustrating the system displaying the Track Entry view for the track.
Figure 5C:
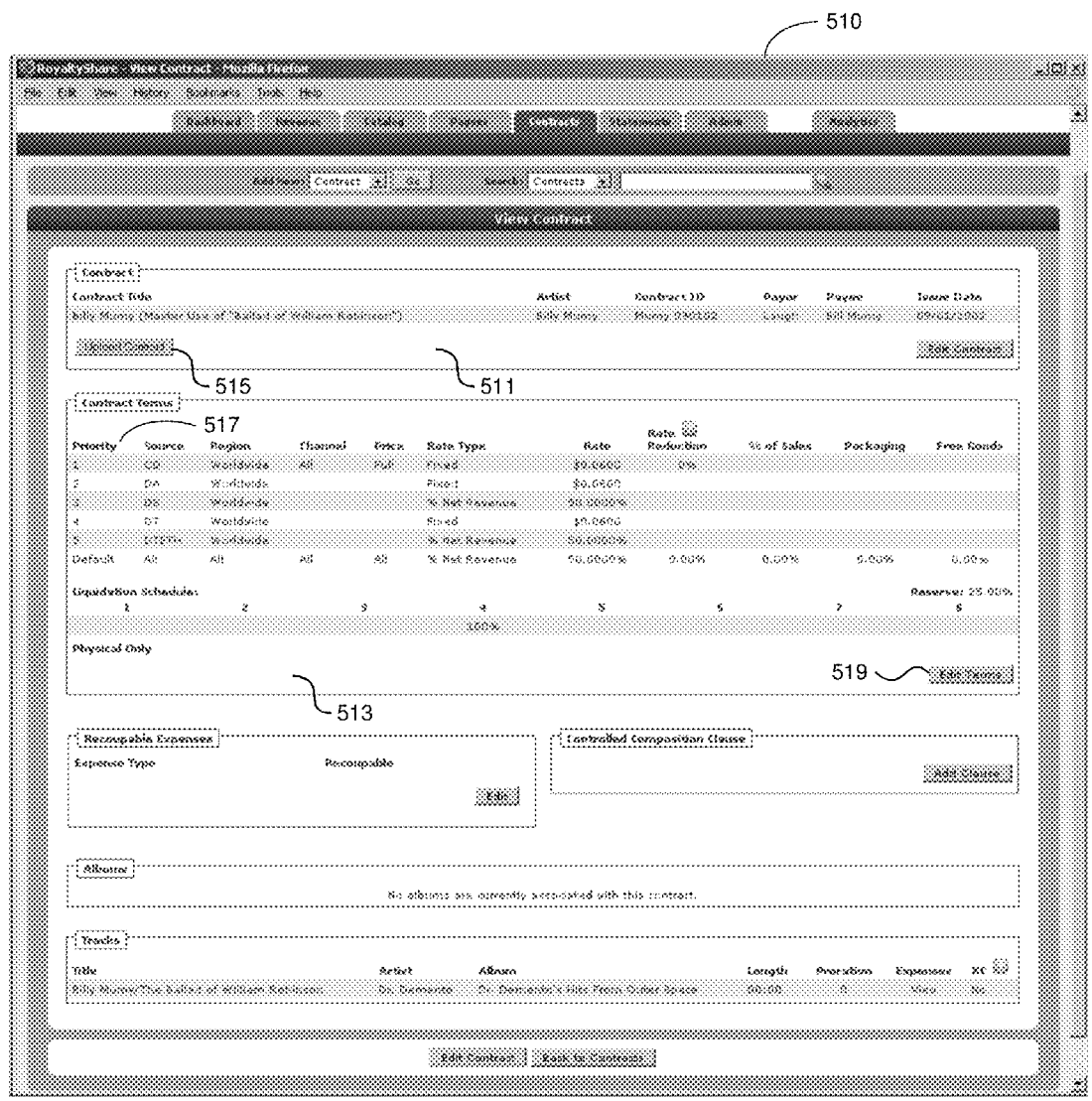
FIG. 5C is a bitmap screen shot illustrating the system displaying the Contract View for the just-selected track.

The following example illustrates user access to contract information. For this example, the album (Dr. Demento's Hits From Outer Space) is a compilation; each track has its own contract. The user begins by selecting ("clicking") the track #10, "Billy Mumy/The Ballad of William Robinson," as shown at 501 in FIG. 5A (from album's track list in View Album, previously shown at 411 in FIG. 4D). In response, the system displays the Track Entry view 503 for the track, as shown at FIG. 5B. Upon the user clicking on the text Billy Mumy (Master Use of "Ballad of William Robinson") at 505, the system displays the Contract View 510 for the just-selected track, as illustrated in FIG. 5C. This shows the track's contract data. As shown, Contract (general contract) data 511 captured includes Contract Title, Artist, Contract ID, Payor, Payee, and Issue Date. Additionally, the Contract View 510 shows the Contract Terms 513.

In the entertainment business, a common type of license arrangement is an unit-based agreement. In a unit-based agreement, the licensor sets the suggested retail price and a percentage royalty that the licensor receives, such as an Elton John album licensed at a suggested retail price ("retail") of $15.00 with a royalty rate of 15% of retail. However, a number of deductions may occur before the 15% is applied. One deduction is a "packaging deduction" where 25% of retail (i.e., $3.75 in the example) is deducted, leaving $11.25 ($15.00-$3.75). Another deduction, historically based, is to pay only on 90% of sales, as an allowance for returns of defective media. Although an important issue in the past, defective media does not pose a problem for digital downloads but the allowance nonetheless continues. Another deduction is for "free goods." This is another historical deduction of approximately 15%, which stems from the days when free goods were given as promotion ("promo copies"). However today, the deduction is largely used to reduce the effective royalty rate. After allowing for all these deductions, the $15 price is quickly whittled down to approximately $9, which the 15% royalty rate is applied against. This generates $1.35 royalty per unit. The total amount of royalty due is computed as $1.35/unit multiplied by net units sold.

As time passes, an album's suggested retail price may decrease, such as from $15 to $10. The reduced-price album is referred to as a "budget album." With a unit-based agreement, the calculation of royalty payments for budget albums is a tedious, error-prone process. Some licensors instead opt for agreements based on percentage of wholesale. For the above $15 album, the wholesale price may be $11.50. Deductions similar to unit-based agreements are applied. A higher royalty rate is applied against a lower amount (wholesale price less deductions) to arrive at an effective royalty rate that is the same as or similar to the suggested retail price-based approach. Newer record companies (especially independent ones) have adopted a simpler approach, using a net revenue-based approach. Here, a flat royalty rate is simply applied against net revenue. A similar approach is to use a net profit-based agreement.

Figure 5D:
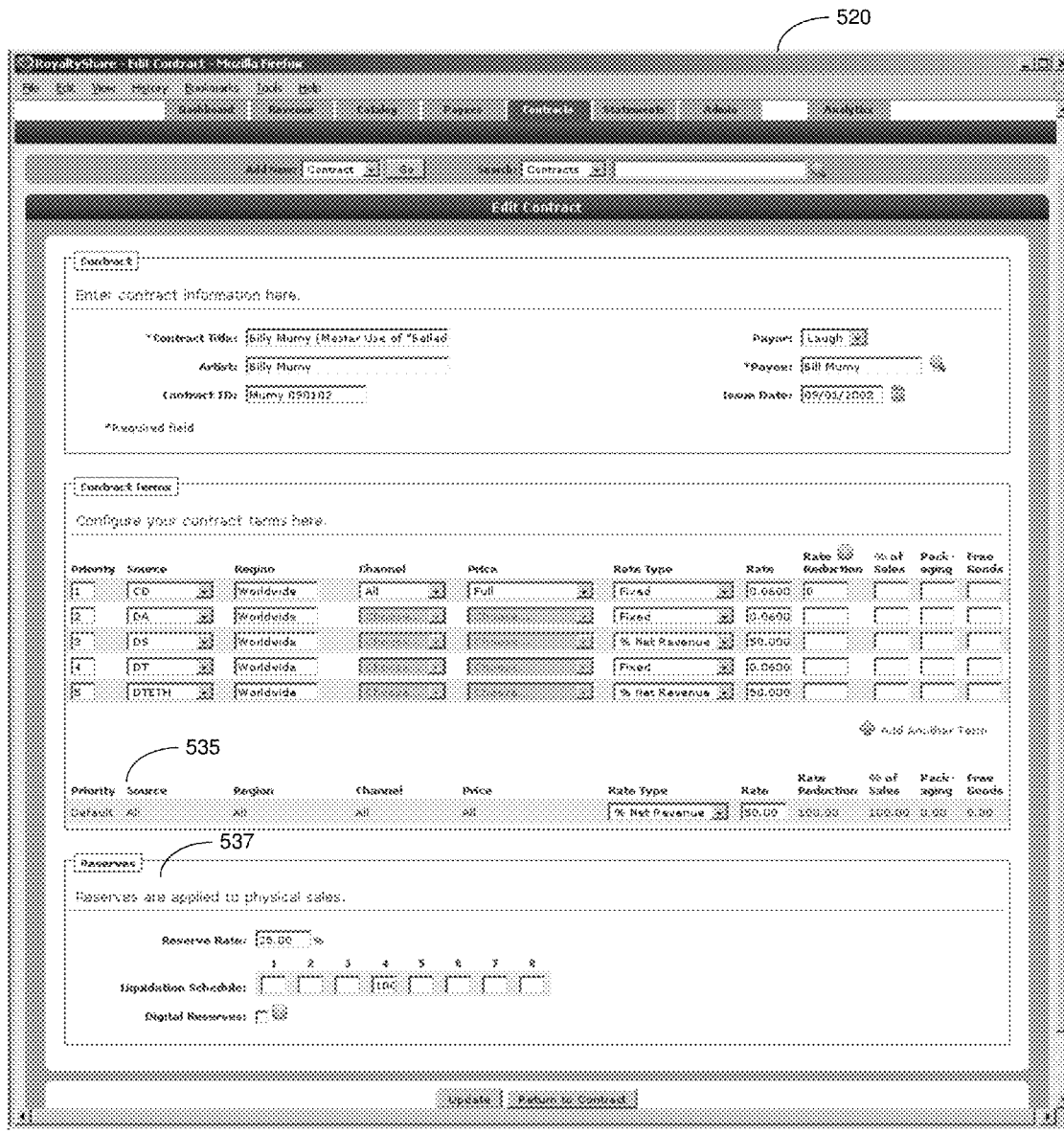
FIG. 5D is a bitmap screen shot illustrating the system displaying an Edit Contract view.
Figures 5E, 5F, 5G:
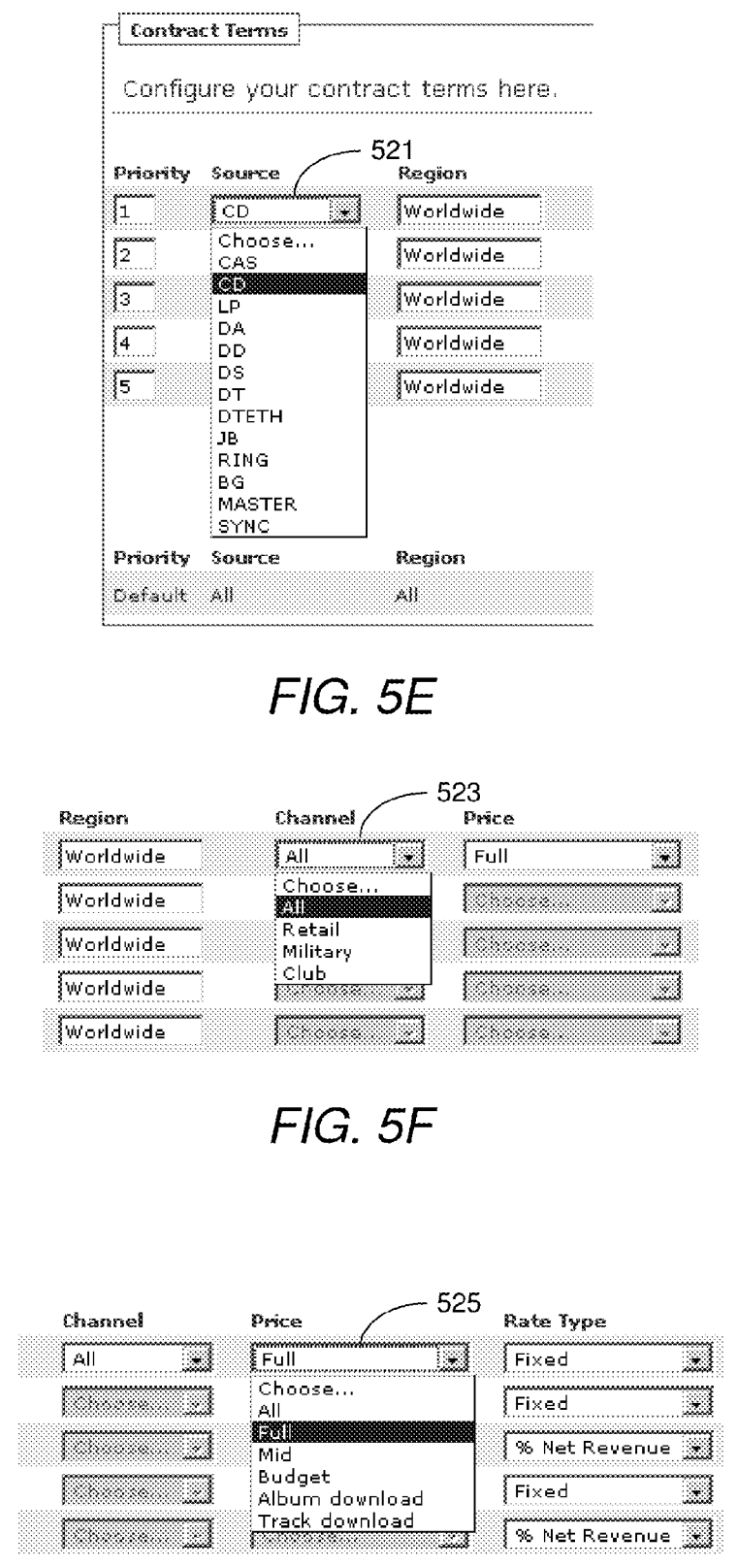
Figures 5H, 5I, 5J:
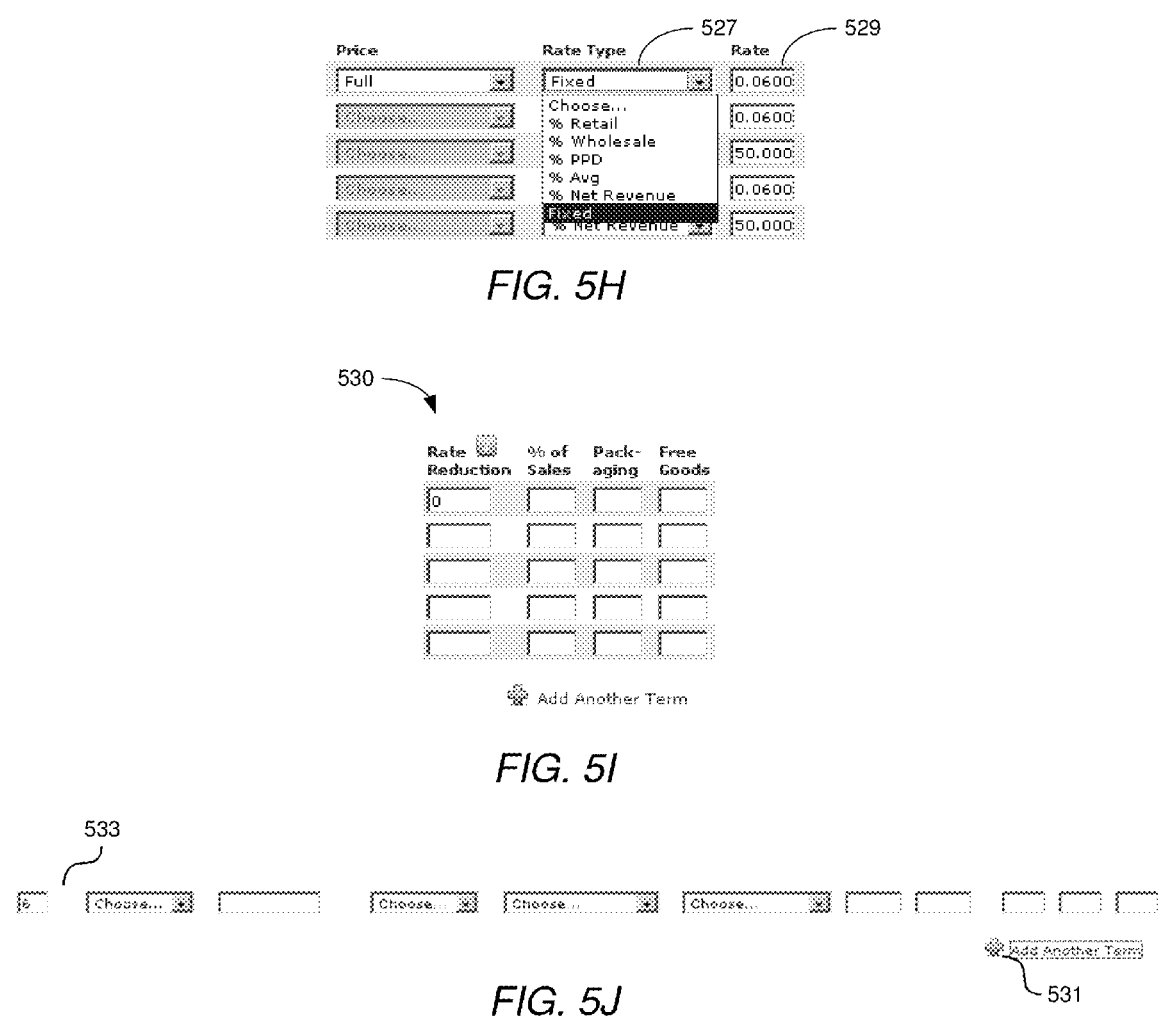

In the currently preferred user interface, these disparate approaches to licensing content are managed using a contract terms list 517, illustrated in FIG. 5C. As shown, the list 517 includes for each item: Priority, Source, Region, Channel, Price, Rate Type, Rate, Rate Reduction, Percentage of Sales, Packaging, and Free Goods. In response to the user clicking "Edit Terms" button 519, the system displays an Edit Contract view 520, as shown in FIG. 5D. Here, the system enables the user to easily edit contract terms. As shown in FIG. 5E, for example, in the Source input field the user can easily select the Source of revenue from a pulldown list 521. Example sources include, for instance, CD, LP, DD (digital download), DS (digital stream), SYNC (motion picture synchronization), ring tone, and the like. Similarly, in the Region input field the user can easily specify the region (e.g., US, Europe, worldwide, etc.) that the content is licensed for distribution. In the system, region is completely user configurable so that any desired geographic region may be specified, including completely arbitrary combinations if desired (e.g., "British Commonwealth except Bermuda"). The user can easily specify the Channel of distribution (e.g., All, Retail, Military, Club, etc.) from pulldown list 523, illustrated in FIG. 5F. Often, a contract will allow a rate reduction based on channel of distribution, such as discount for military (PX) or club sales. In a similar manner, the user can easily specify the Price (e.g., All, Full, Mid, Discount, Budget, etc.) from pulldown list 525, illustrated in FIG. 5G, and specify the Rate from edit field 529, illustrated in FIG. 5H. For the example track (Billy Mumy/The Ballad of William Robinson"), the rate for CD distribution is fixed at $0.06 per track (CD) sold. Applicable deductions and discounts (e.g., Rate Reduction, Percentage of Sales, Packaging, Free Goods, etc.) may be entered in the discount edit fields 530, shown in FIG. 5I. In this manner, other contract terms may be added for other types of distribution, such as digital streaming (DS) worldwide, at a rate of 50% of net revenue. As illustrated in FIG. 5J, the user may continue adding additional contract terms (as many as desired) by the clicking "Add Another Term" 531, whereupon a new row 533 is added for receiving additional contract terms. Here, the user can fashion any desired combination of terms, such as LP sales in Europe or digital streaming (DS) sales in Canada.

As also shown, each contract term is assigned a Priority ranking. This allows the system to assign the correct royalty rate when a given transaction is potentially covered by more than one contract term. Each transaction is processed against the prioritized list of contract terms. As soon as a contract term "fires" (i.e., conditions are met), the applicable royalty rate is applied to that transaction. In the event that a given transaction does not meet the conditions of specific contract terms, the transaction "falls through" to a default contract term, shown at 535 in FIG. 5D. The default contract term provides a "catch all" for transactions that do not fall within any other category of contract terms. If desired, the default contract term may be set to a royalty rate of zero, indicating that the licensor or artist will not be paid for non-matching transactions. The user interface also includes support for handling Reserves that are to be applied to physical sales. As shown in FIG. 5D, the interface includes a Reserves section 537 that allows the user to specify a Reserve Rate and a Liquidation Schedule. In the example shown, for any revenue that comes in for the quarter, 25% is reserved (held back) for a period of four quarters (whereupon 100% is then paid back). Reserves serve as a mechanism to allow distributors or retailers to cover product returns that may materialize (and could even lead to negative royalties). By structuring the user interface in this manner, the task of handling royalty payment calculations for agreements having a multitude of contract terms is greatly simplified.

Figure 6A:
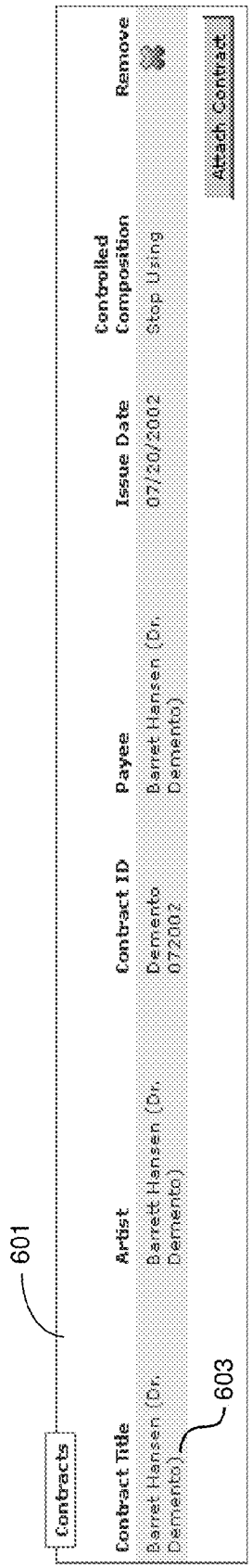
FIG. 6A is a bitmap screen shot illustrating a Contracts section from the View Album page (FIG. 4D), which is used to represent album-level contracts.
Figure 6B:
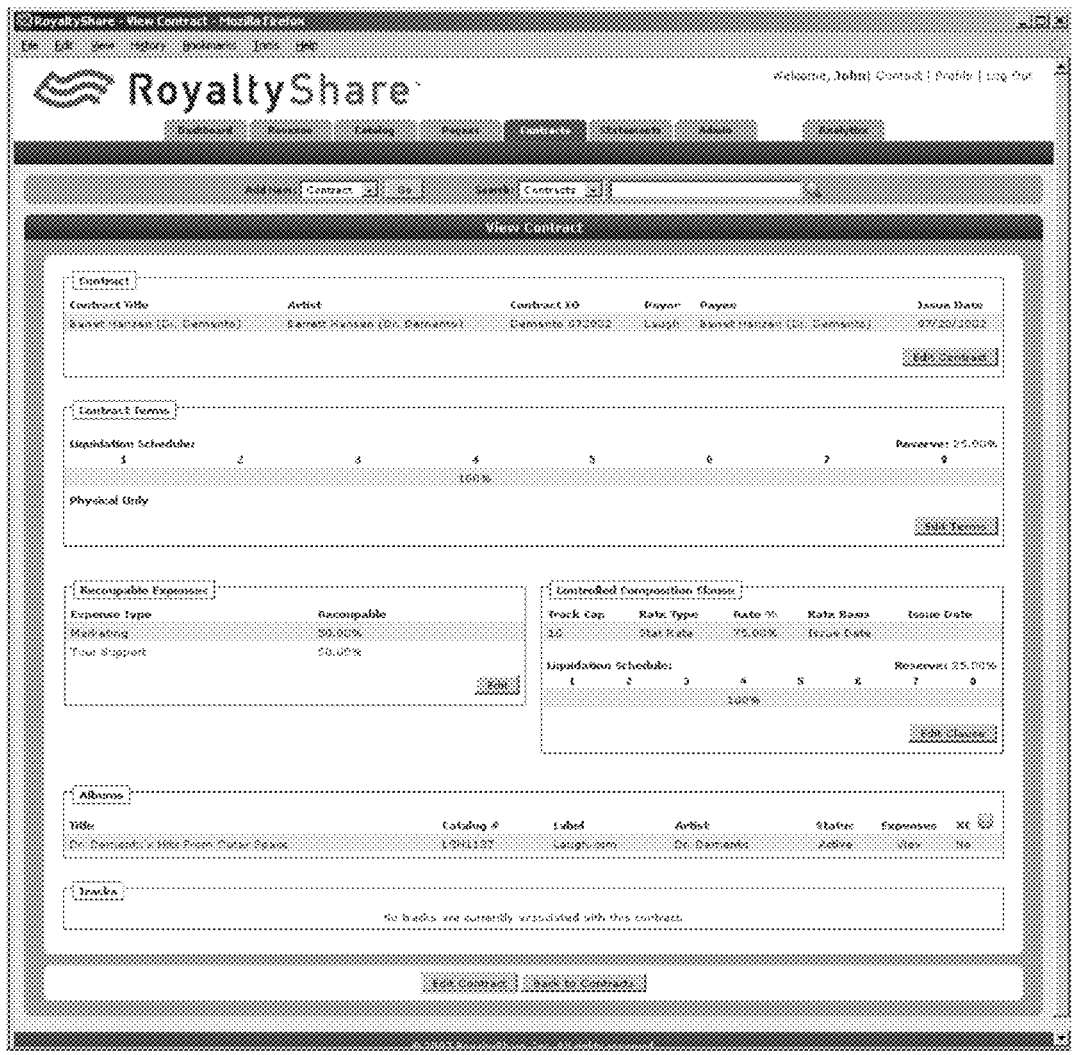
FIG. 6B is a bitmap screen shot illustrating that the system displays the Contract View for the album-level contract.

In order to distribute content, two basic types of rights must be acquired (1) rights to the sound recording ("master"), and (2) rights to the underlying musical work ("song"). Typically, each is handled by a separate contract or license—that is, one for the master, and one for the song itself. FIG. 6A shows a Contracts section 601 from the View Album page (FIG. 4D), which is used to represent album-level contracts. For the album "Dr. Demento's Hits From Outer Space," Barrett Hansen ("Dr. Demento") suggested third-party tracks for a compilation album, which includes his mark Dr. Demento. Upon the user clicking the contract title 603 ("Barret Hansen (Dr. Demento)"), the system displays the Contract View for the album-level contract, as shown at 610 in FIG. 6B. In other words, the view displays Barret Hansen's contract at the album level. This contract accounts for royalty payments that must be made to Barret Hansen for his expertise and knowledge in selecting the compilation and use of his mark Dr. Demento, in addition to any royalty payments that must be made for individual tracks (i.e., royalty payments to 12 different third parties for the 12 individual masters for the tracks appearing on the album). Album-level contracts also arise in instances where the recording artist is also the composer. For an Elton John album, for example, Elton John may also receive an album-level royalty payment for the compositions, as none of the masters are licensed from third parties.

The license to the music publishing rights of the underlying work ("song") is commonly referred to as the mechanical reproduction license or simply "mechanical" license. This type of license arose from rights conferred in the 1909 Copyright Act, where Congress overturned the Supreme Court's 1908 decision in White-Smith Music Publishing Company v. Apollo Company (finding that piano rolls were not copies of plaintiffs' copyrighted sheet music, but were instead parts of the machine that reproduced the music). The Copyright Act of 1909 recognized that mechanical reproductions of music were copyrightable. Therefore, the copyright owner of a work (musical piece) has not only an exclusive right to perform the work but also an exclusive right to make mechanical reproductions of the work (i.e., beyond mere sheet music). At the same time, Congress instituted a compulsory licensing scheme for mechanical reproductions. This allows one to compel the copyright owner (publisher) to grant a license (at a statutory rate), insofar as the copyright owner has granted license to at least one other party. Edison's later invention of the phonograph was also held to be a mechanical reproduction. Compact discs ("CDs"), although less mechanical in nature than a phonograph, are also mechanical reproductions. Similarly, digital downloads are also mechanical reproductions, even though digital downloads may be played on devices having no moving parts. In all these instances, a "mechanical" license (e.g., at a statutory rate, such as 9.1 cents per copy) may be needed in order to allow a track to be mechanically reproduced.

In the system of the present invention, whether a given track requires payment of a mechanical license (a "mechanical") is tracked by a "Pay Mechanicals" field 502 (FIG. 5A) in the album's track list in View Album. In licensing, it is occasionally the case that a track will be licensed from a third party record company that is responsible for paying any mechanical license. The "Pay Mechanicals" field allows the user a simple input means for specifying whether he or she must account for any mechanical license (and rate). For example, the field indicates that for the Billy Mumy/The Ballad of William Robinson track mechanicals should be paid. Therefore, in addition to any other royalty payments due, the system tracks the additional amount due for mechanicals. If the Pay Mechanicals field is set to "No" for a given track, on the other hand, then the system will not accrue for mechanicals. On the Rusty Humphries/Do The Picard track, for example, mechanicals are not paid as the underlying contract includes a master rate that compensates both the sound recording and license for mechanical reproduction. Again referring back to FIG. 5A, the View Album page includes an "Exclude Mechanicals" button that allows the user to easily exclude mechanical licenses. This option may be appropriate, for example, in situations where payment for all tracks is made to a third-party company that is responsible for payment of any mechanicals (or is owner of the master).

Figures 7A, 7B:
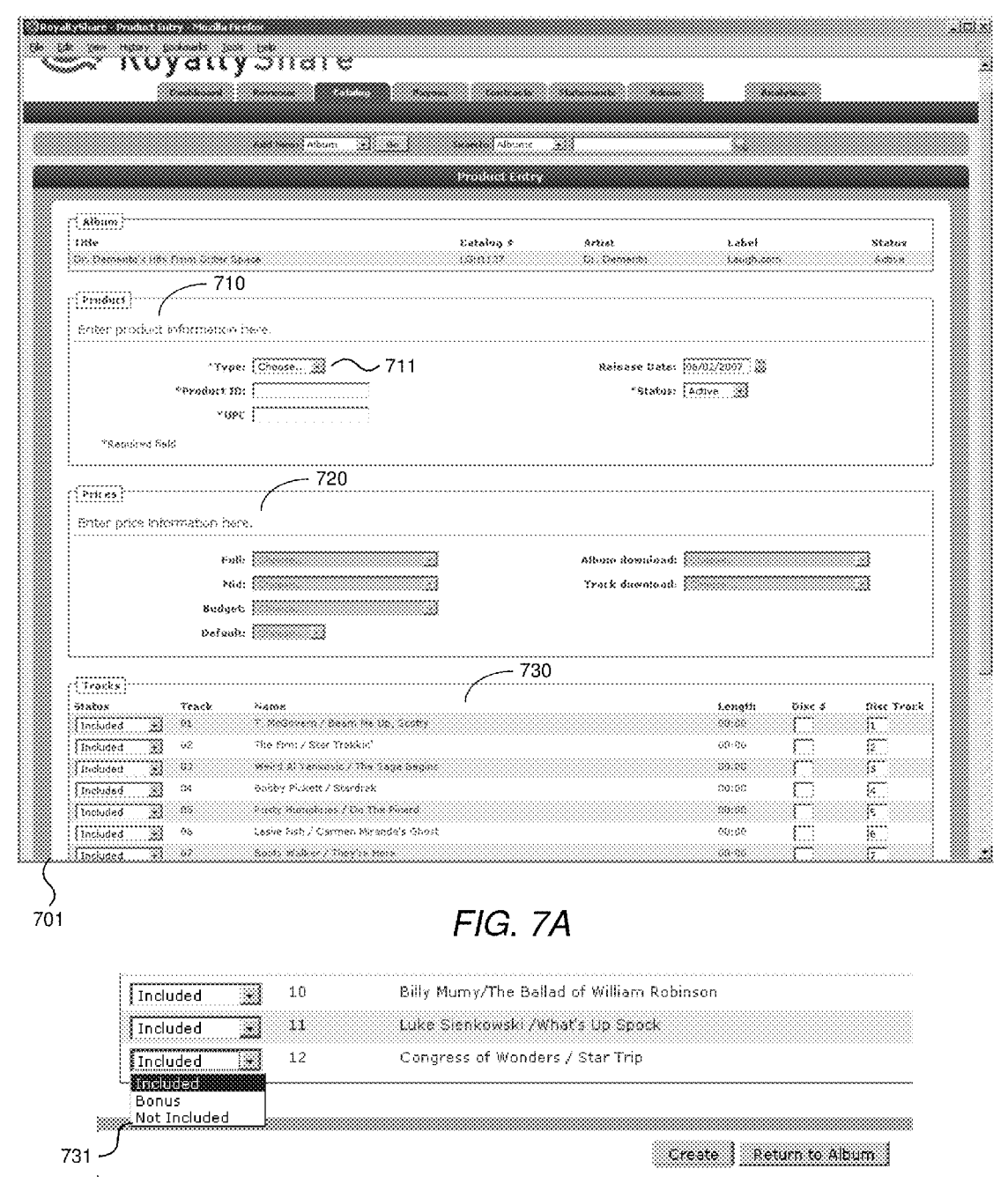

Returning to the View Album page of FIG. 4D, the user may click an Add Product button 417 for adding additional product types. This takes the user to a Product Entry page 701, shown in FIG. 7A. From Product section 710, the user may select a product type from pulldown list 711. For example, the user may enter a product type of LP, and then enter the Product ID, UPC, Release Date, and Status, in the respective input fields. In a similar manner, in Pricing section 720, the user enters pricing information for the product. At Track section 730, the user can indicate the specific tracks that are to be included on the product, including the track order and disc number (for multi-disc product). As shown at 731 in FIG. 7B, the user can specify that the track is Included, Bonus, or Not Included. For the example of an LP product, a smaller number of tracks are possible (as compared to CD product), and thus the user may want to specify that certain tracks are not included. After the user has specified all choices, he or she clicks a Create button at the bottom portion of Product Entry page (not shown). The system in turn creates appropriate entries to track the new product. Importantly, the system is able to determine for each product the specific tracks and corresponding royalty payments involved. For the LP product, for example, royalty payments are not accrued for any track "Not Included." The ability to separately track Bonus tracks is provided (e.g., for issues related to calculating royalties for "controlled compositions" in licensing agreements).

Figure 8A:
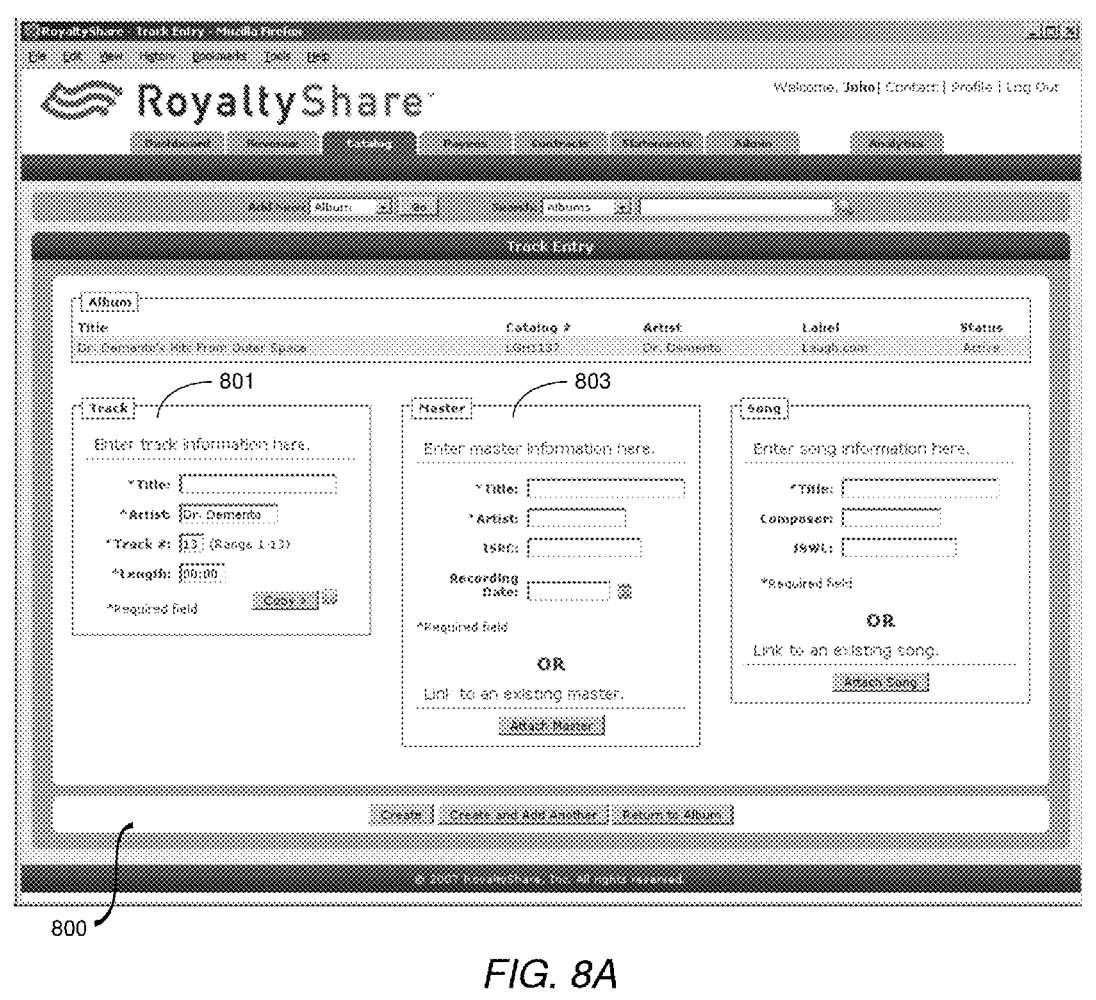
Figure 8B:
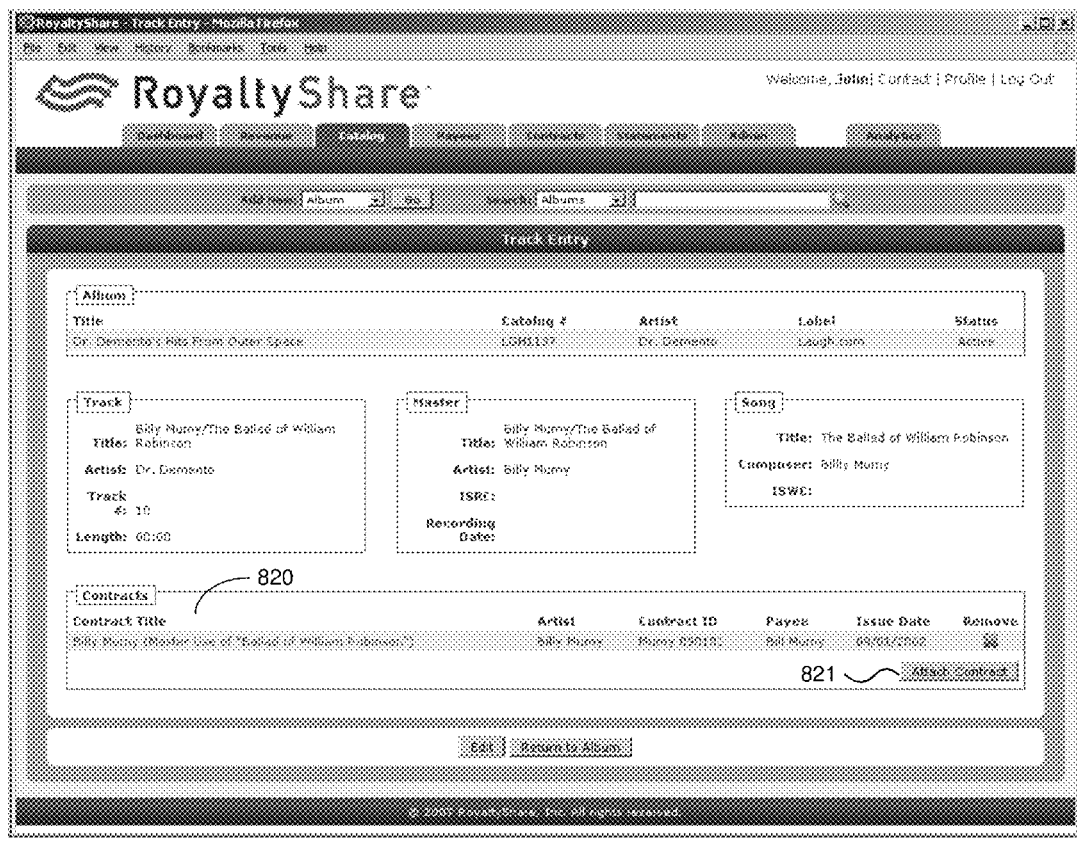
FIG. 8B is a bitmap screen shot illustrating the Track Entry page for a completed entry.

To add tracks to an album, the user invokes an Add Tracks button (shown in FIG. 5A), whereupon the system displays Track Entry page 800, shown in FIG. 8A. This interface allows the user to easily add tracks to an album. For example, suppose the user wants to add a bonus track. The user can easily add the new track by entering information into Track section 801. In the Master section 803, the user may specify the corresponding master. If the master already exists in the system (e.g., as part of another album), the user can easily link to it using the Attached Master command button. FIG. 8B illustrates the Track Entry page for a completed entry. As shown, master contracts are listed in Contracts section 820. Multiple contracts may be added by the user. This is helpful, for example, when a track includes a sampling from another track. Suppose, for instance, that the listed Billy Mumy track includes a four second digital sampling from a Phil Collins track, and that the Collins publisher wants two cents per track royalty (fixed rate) for use of that sampling. Using the interface of the present invention, this scenario is easily accommodated. The two cents additional royalty is specified as an additional contract covering the digital sampling. Then, that newly created contract is attached to the Billy Mumy track using the Attached Contract command button 821 of the Track Entry page. As a result of the addition, when the system calculates royalty payments due, the system calculates (in addition to any royalty payable to Billy Mumy) an additional royalty payable to the music publisher (e.g., Atlantic) for use of the sampling.

Figures 9A, 9B:
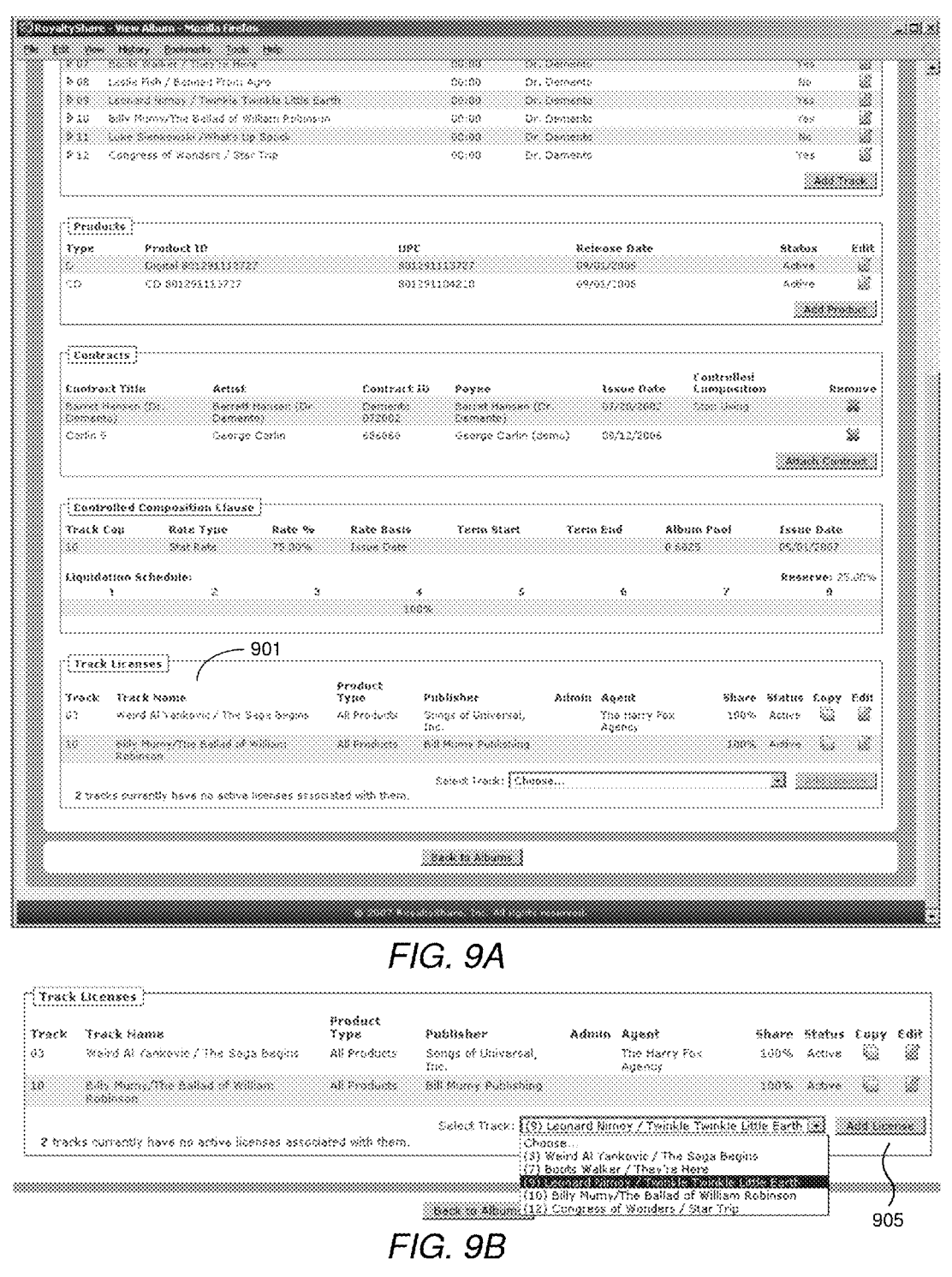
Figure 9C:
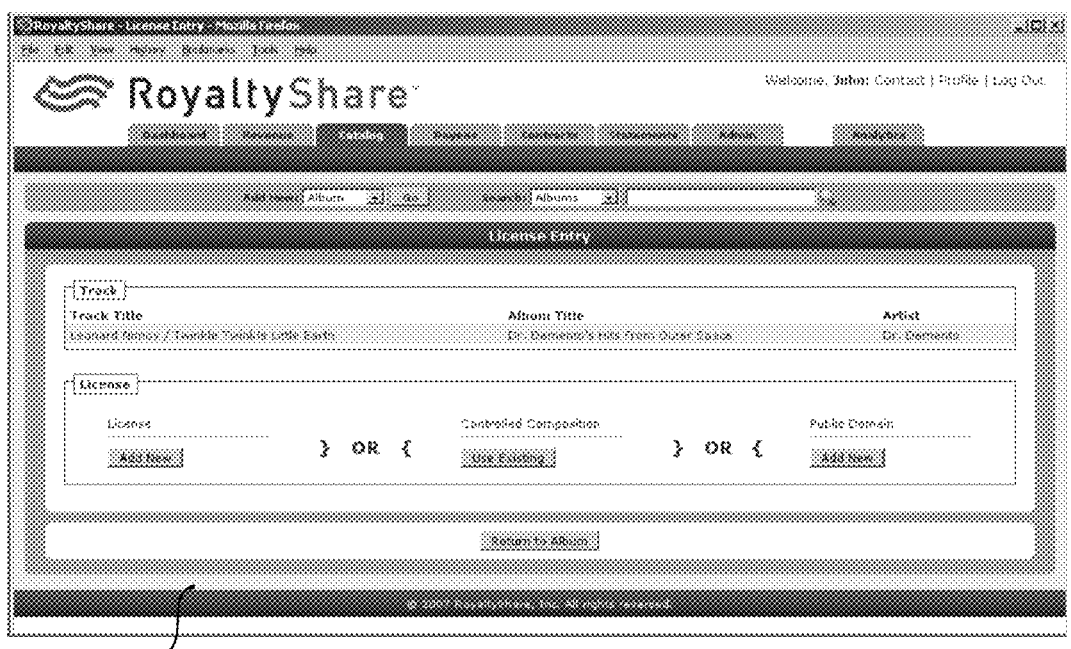
FIG. 9C is a bitmap screen shot illustrating that the system displays a License Entry page.
Figure 9D:
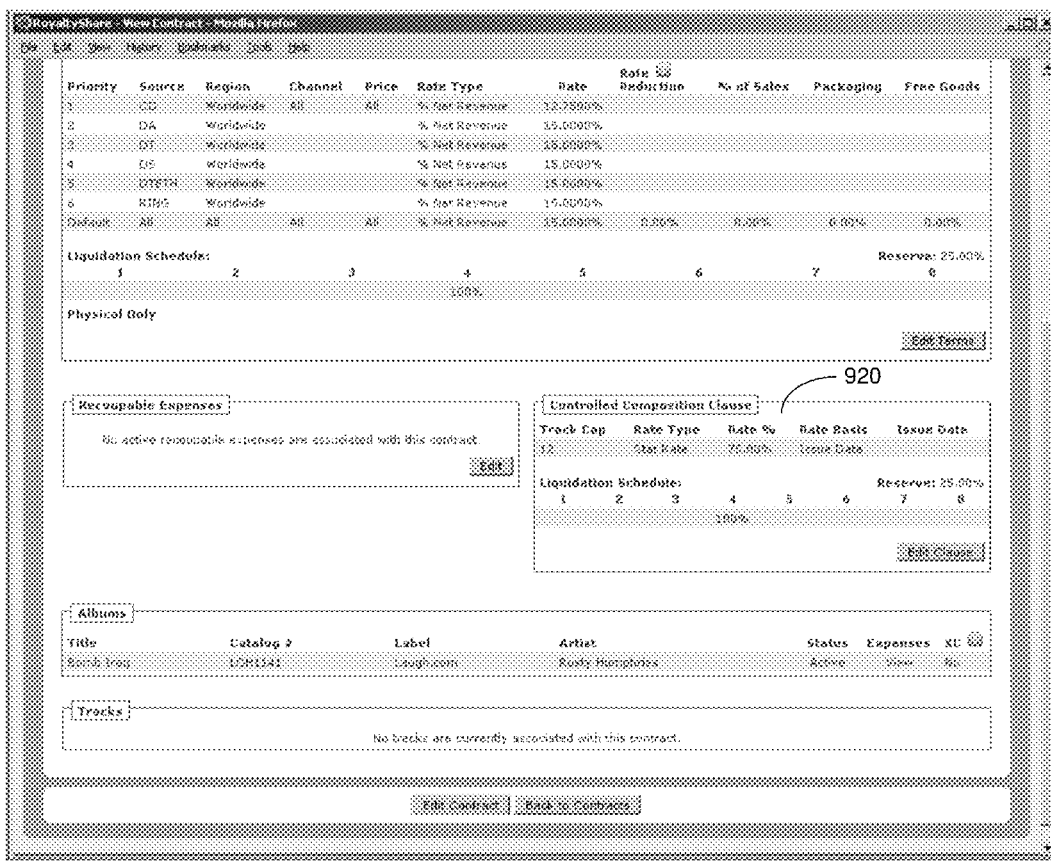
FIG. 9D is a bitmap screen shot illustrating the user interface for handling controlled composition clauses.
Figure 9E:
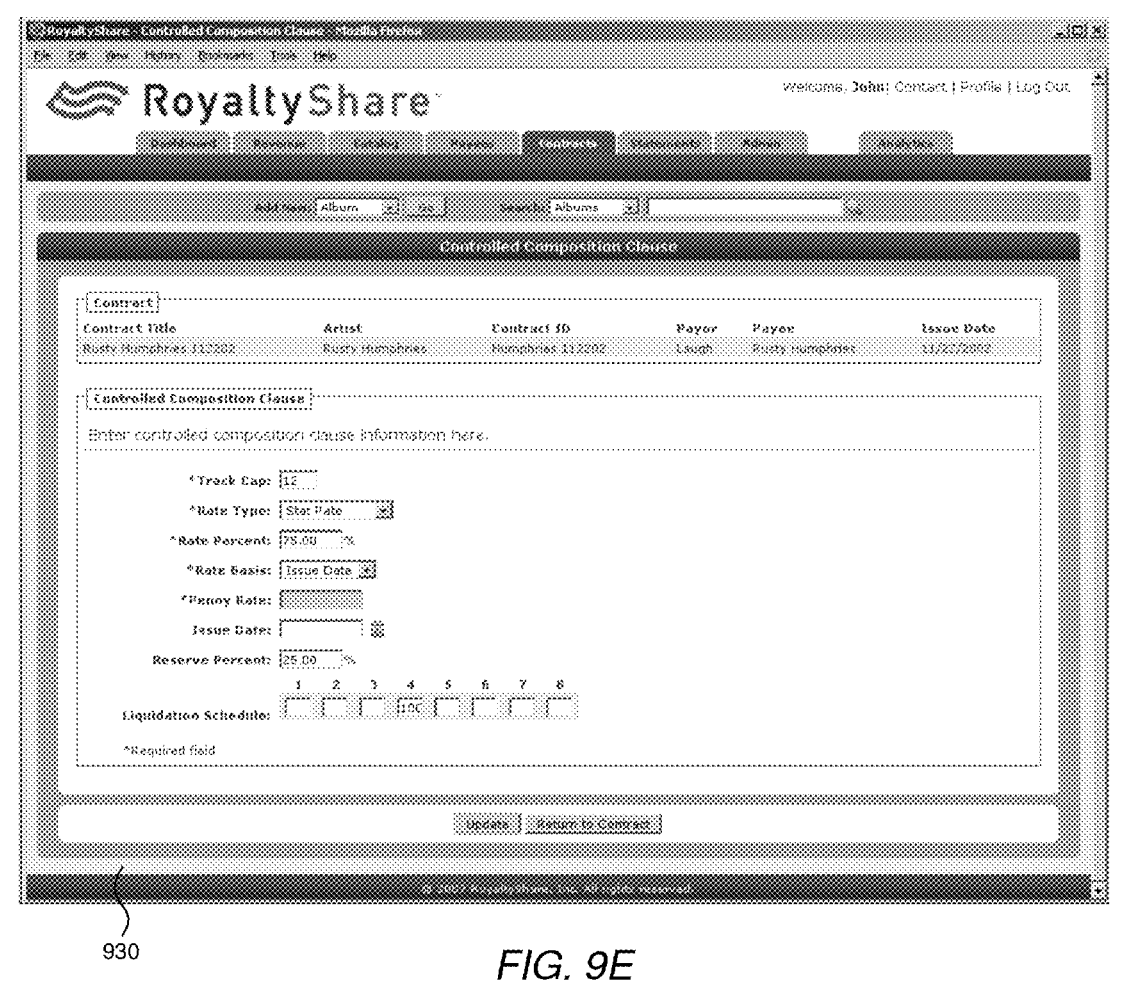

Returning now to the View Album page (e.g., shown in FIG. 4F), the bottom portion of the page includes a Track Licenses (mechanicals) section, as shown at 901 in FIG. 9A. To add a license, the user clicks the Add License button 905, shown in FIG. 9B. In response, the system displays License Entry page 910, as shown in FIG. 9C. In order to tell the system that the track is in the public domain (and no mechanical license required), the user clicks Add New under Public Domain. In some cases, the song will be owned by the performer (e.g., singer/songwriter Elton John, who writes many of his own songs). In order to easily accommodate this scenario, music publishers may employ a "controlled composition" clause. The upshot of the clause is that if the performer also owns or controls the underlying composition, then the licensee (e.g., music publisher) will not paid the statutory rate for the mechanical, but instead will pay a (typically reduced and/or flat) controlled composition rate. The system enables the rate to be specified as some percentage of statutory rate (e.g., 75% of statutory rate) and during computation of royalties applies the statutory rate currently in effect (for contracts not specifying a fixed statutory rate). By using the controlled composition feature of the present invention, the user can easily handle artist royalty payments and underlying mechanical payments in a single system, in contrast to the laborious prior approach of employing separate systems. FIG. 9D illustrates the user interface for handling controlled composition clauses. As shown, the interface includes a Controlled Composition Clause section 920. Upon the user clicking the Edit Clause button, the system displays a Controlled Composition Clause edit page 930, as shown in FIG. 9E. In the example shown in the edit page 930, the controlled composition clause is capped at 12 tracks at a rate of 75% statutory rate based on a lock date, with a reserve for returns.

Figure 9F:
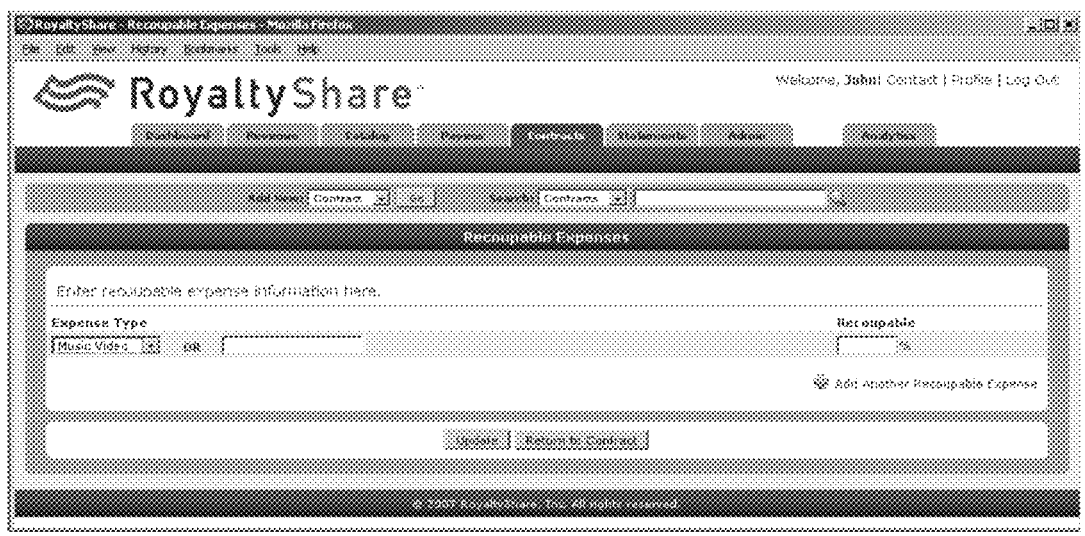
FIG. 9F is a bitmap screen shot illustrating the entry of Recoupable Expenses (e.g., marketing, music videos, tour support, print ads, and the like).

The entry of Recoupable Expenses (e.g., marketing, music videos, tour support, print ads, and the like) is illustrated in FIG. 9F. In the example, the user inputs recoupable expenses for music video production. A typical contract would specify that 50% of expenses for music video production may be recouped from royalties. Transactions associated with the recoupable expenses may be entered (not shown), whereupon the royalty payment calculation offsets the amount due based on applicable entered expenses that are recoupable from royalties.

Figure 9G:
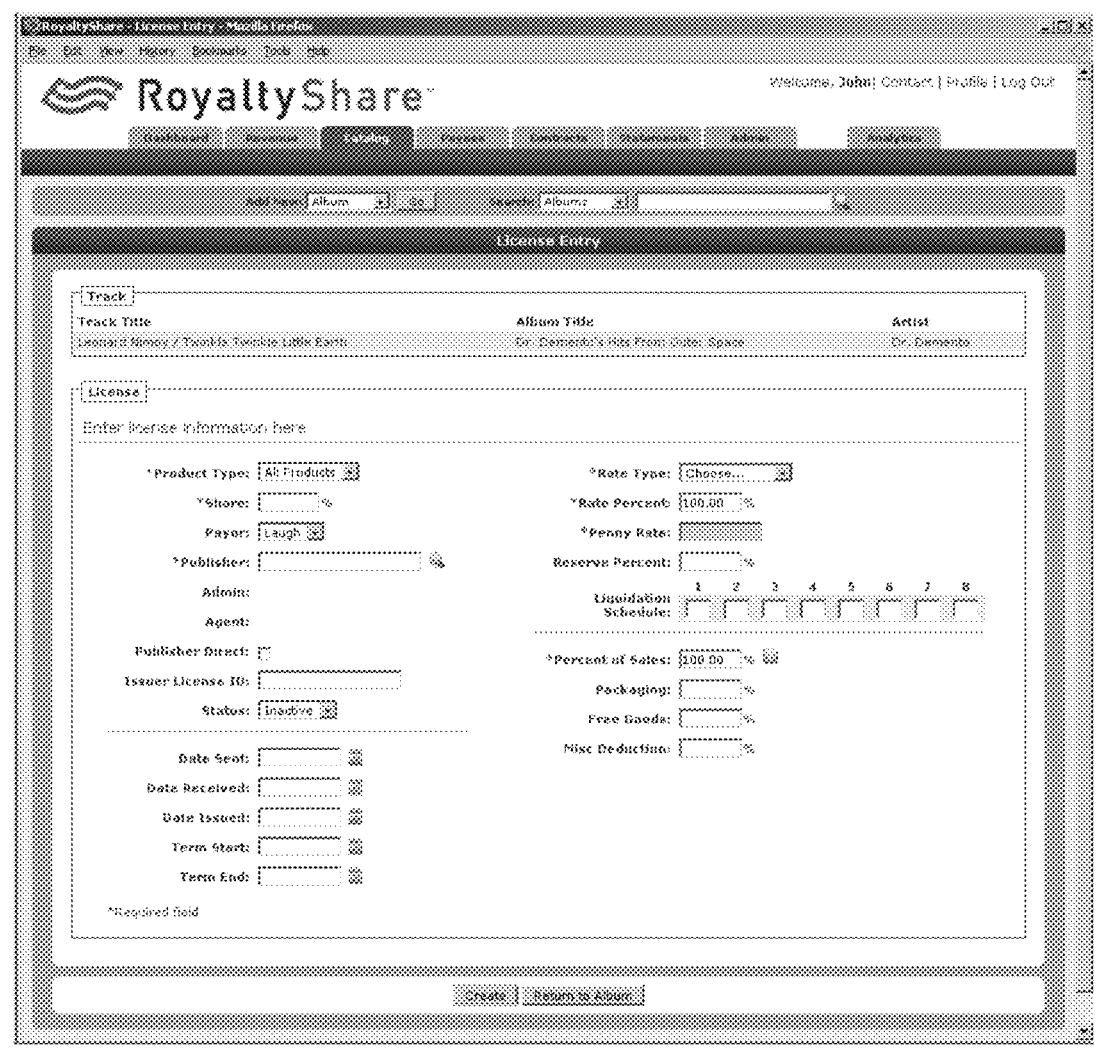

Returning to the discussion of Track Licenses, in order to add a new license the user clicks on Add New under License. In response, the system displays a License Entry page 920, shown in FIG. 9G. Under Product Type, the user specifies the product configuration (e.g., CD, LP, digital download, etc.). Typically, publishers issue mechanical licenses that are tied to a particular product configuration. For example, if a licensee had a mechanical license for CD product configuration and wanted to distribute the track on iTunes, the licensee would be required to go back to the publisher to obtain a mechanical license for digital download. The Share % field indicates what percentage of the song that the publisher owns (e.g., 100%, or something less). The Publisher field receives the user input of the particular Publisher; the system includes lookup capability for publishers already listed in the system. Admin and Agent fields are automatically completed by the system, based on the specified publisher. For example, for EMI, the system automatically lists EMI's agent, the Harry Fox Agency (HFA). However the user may specify that the publisher is paid directly by ticking the Publisher Direct checkbox (e.g., override the default instructions to pay the Harry Fox agency and instead pay EMI directly). In Issuer License ID, the user enters the appropriate ID (e.g., Harry Fox license ID).

Under Rate Type, the user specifies one of: statutory rate, minimum statutory, or penny rate (i.e., specified fixed rate). In the Rate Percent Field, the user may specify that the statutory rate be reduced (e.g., 75% of statutory rate). The statutory rate may be fixed to the Sales Date or a set (Lock) date. If the rate is tied to a locked date, then the rate is fixed to the then-current statutory rate (i.e., fixed forever). Otherwise, in the case that the rate is fixed to the sales date, the rate is pegged to the statutory rate in effect at the time of the sale (typically, the rate changes every two years). Date Sent and Date Received are provided to allow the user to easily track requested mechanical licenses (especially in view of the long turnaround time involved in getting mechanical licenses from publishers). Date Issued receives user input for the actual license issue date. Lock Date allows fixation of royalty rate. Term Start and Term End allow the user to specify a term limited mechanical license, if necessary. The remaining fields for Liquidation Schedule and deductions function in a manner similar to that described elsewhere.

Figure 10A:
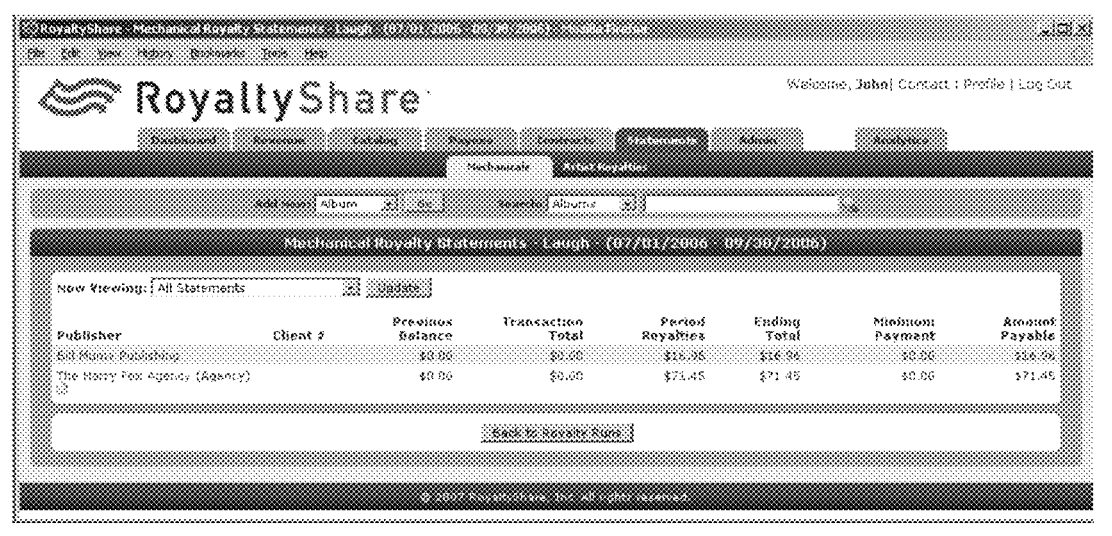
Figure 10B:
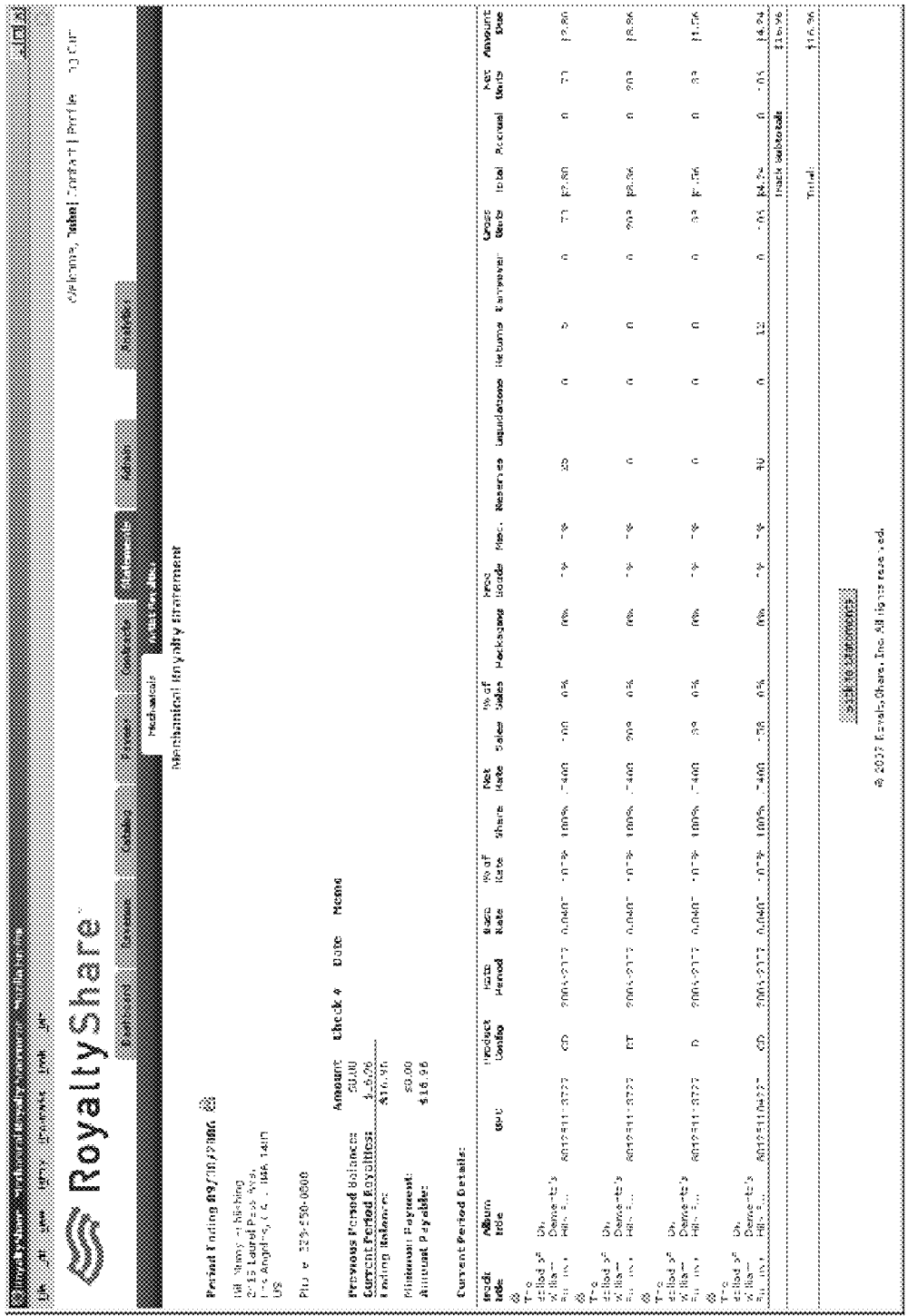
FIG. 10B is a bitmap screen shot illustrating that upon the user clicking the first one (hyperlink), the system displays the corresponding Mechanical Royalty Statement (detailed).
Figure 10D:
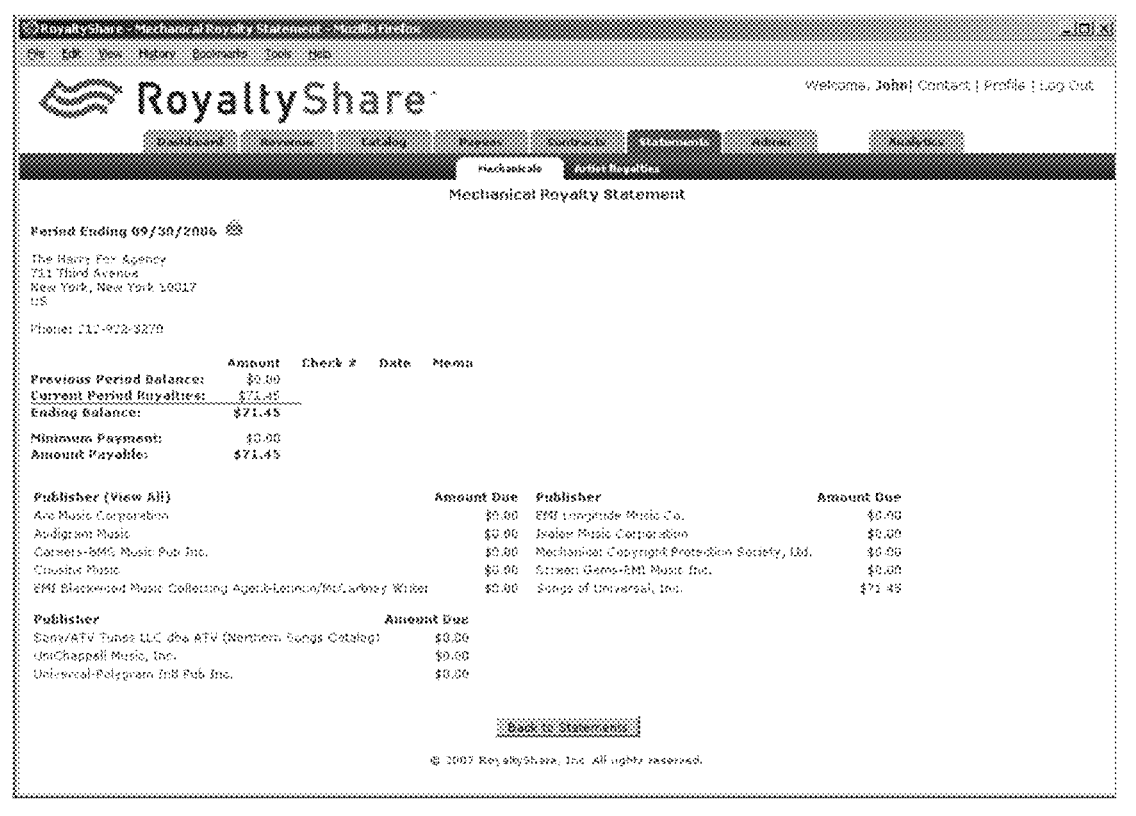
Figure 10E:
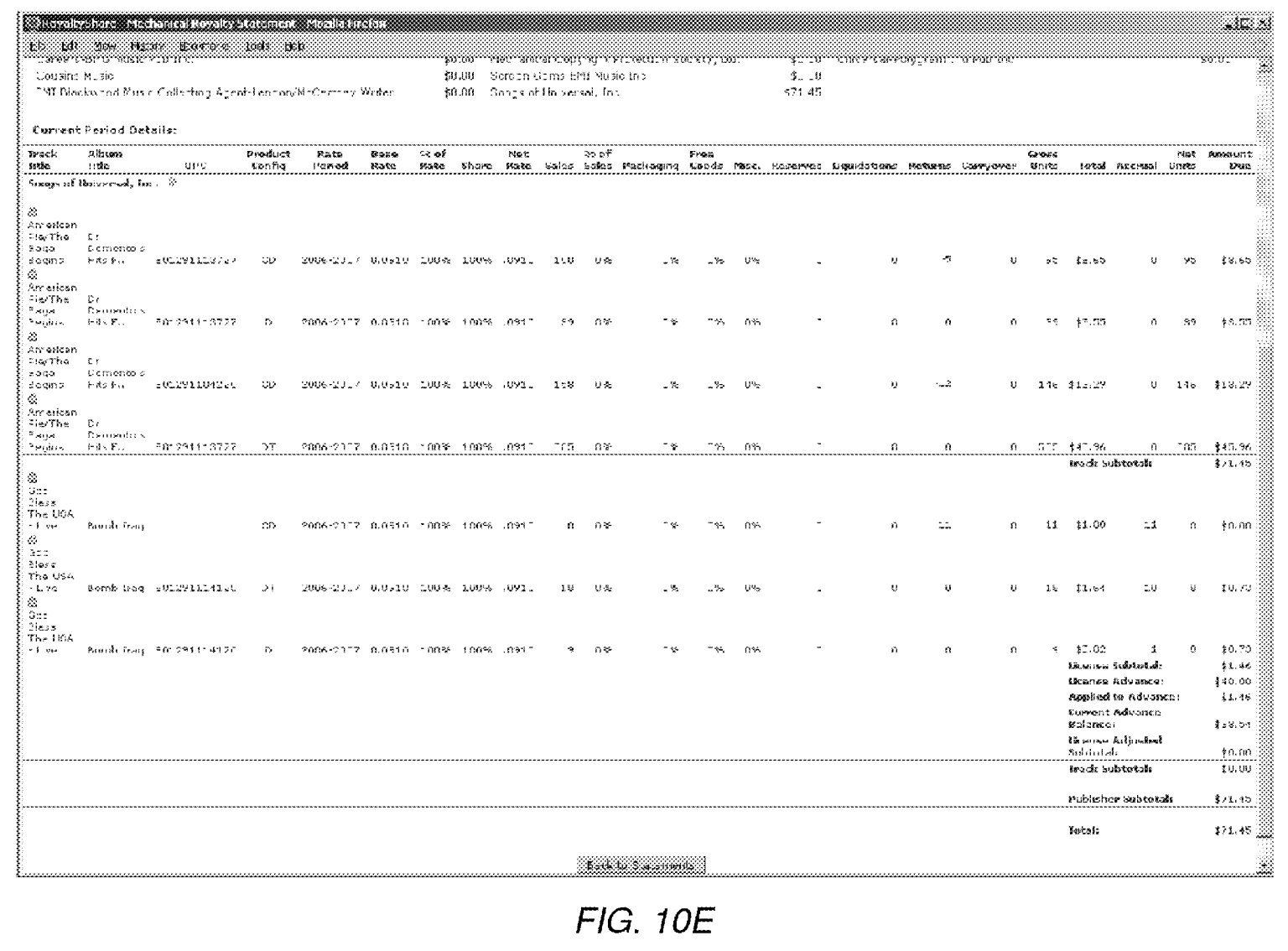

Once the catalog and revenue data (line items) have been loaded, the system (which knows all of the applicable contract terms) invokes its calculation engine to generate proper and complete royalty statements. Two types of statements are provided by the system: Mechanical Royalty Statements and Artist/Producer Royalty Statements. FIG. 10A illustrates a sample list of statements for mechanicals. Upon the user clicking the first one (hyperlink), the system displays the corresponding Mechanical Royalty Statement (detailed), as shown in FIG. 10B. A higher-level (less-detailed) statement, shown in FIG. 10C, is generated simply by clicking the printer icon in the detailed statement. Once the appropriate royalty statement has been generated, the user (royalty manager) instructs the system to send the statement out (e.g., electronically, such as e-mail with hyperlink). FIG. 10D illustrates a sample statement for the Harry Fox Agency, which represents a number of publishers. As shown, the amount due for each publisher is listed individually. For example, upon the user clicking Songs of Universal, the system displays the corresponding detailed view shown in FIG. 10E.

High-Level System Architecture

Figure 11:
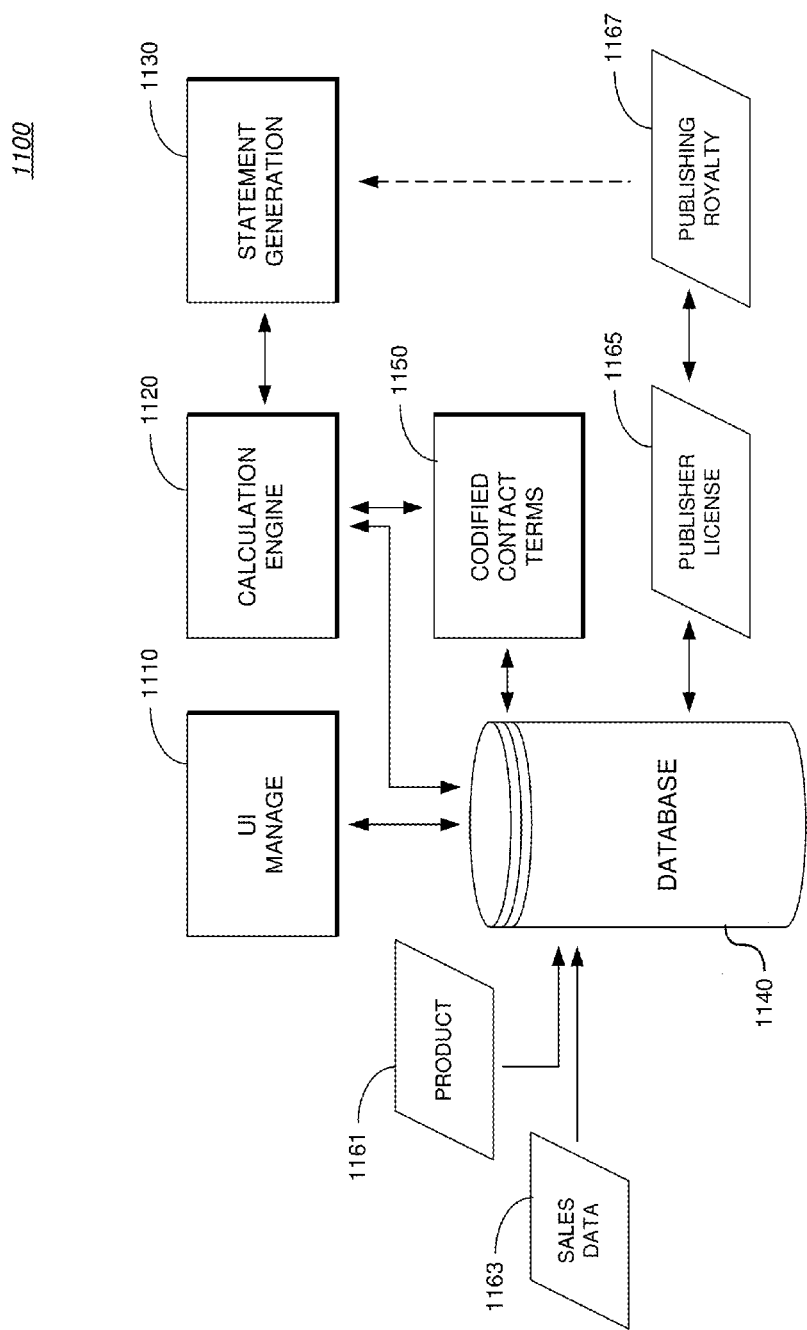
FIG. 11 is a high-level block diagram illustrating system architecture for a Web-based Royalty System constructed in accordance with the present invention.

FIG. 11 is a high-level block diagram illustrating system architecture for a Web-based Royalty System 1100 constructed in accordance with the present invention. As shown, the system 1100 includes a UI management module (manager) 1110, a calculation engine 1120, a database 1140, a codified contract terms module 1150, and a statement generation module (generator) 1130. As shown, the system interacts with the following data interfaces: product (information) 1161, sales data 1163, publisher license (data) 1165 and publisher royalty (data) 1167. The interfaces provide a means to input data into the system, which in turn is stored in the database 1140. For example, the sales data interface 1163 provides a means to input sales data. Here, the user may input sales data via user interface, including manual data entry or by file upload. The other interfaces operate in a like manner.

Publisher license 1165 and publishing royalty 1167 provide a means to receive data necessary for calculation of mechanicals. In the currently preferred embodiment this calculation is performed separately from other royalty calculations (i.e., outside the calculation engine 1120) by a special-purpose calculation engine (not shown) that is customized for processing mechanicals. However, those skilled in the art will appreciate that the work of calculating mechanicals may be subsumed by the calculation engine 1120, if desired.

Basic operation of the system 1100 is as follows. Responsive to user operation of the system (e.g., user indicating via Web browser input that royalty statements are to be generated), the system begins operation by invoking the calculation engine 1120 to retrieve the sales data and product information from the database 1140. In the currently preferred embodiment, the database employs MySQL 4.1 (available from MySQL AB of Uppsala, Sweden). After consulting the contract terms (provided by the codified contract terms module 1150), the calculation engine 1120 performs necessary calculations to compute figures for royalty reporting. This output is provided to the statement generation module 1130, which in turn generates formatted reports (statements). Internal operations of the system will now be discussed, by examining internal methodologies that are employed.

Internal Operation

Computation and Report Generation

Figure 12:
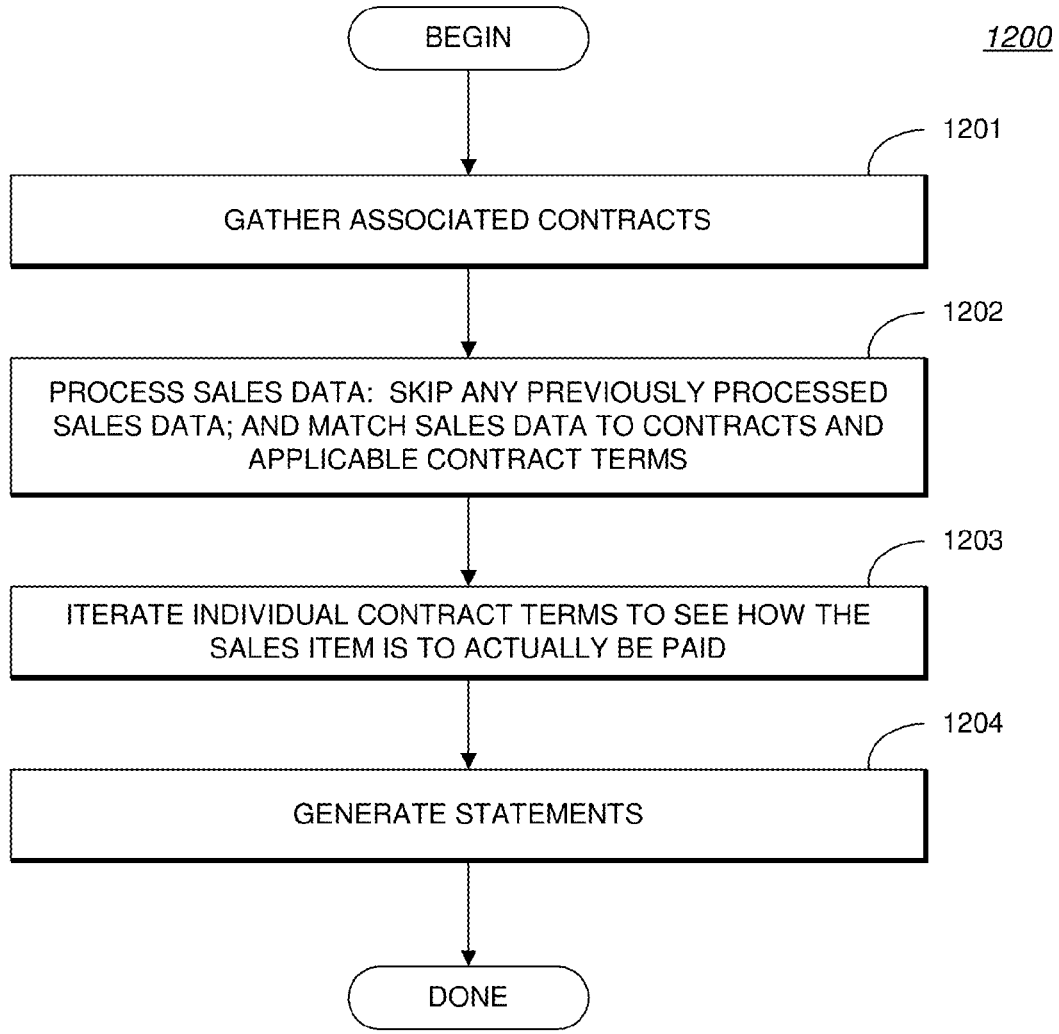
FIG. 12 is a flowchart illustrating a computation and report generation method of the present invention.

FIG. 12 is a flowchart illustrating a computation and report generation method 1200 of the present invention. Recall from above that product, sales data, contract, and royalty publishing and royalty information are stored by the system. Before invocation of the method 1200, sales data has already been matched to product, which in turn has been associated with contracts (e.g., album product or track product). For detailed description of this matching process, refer to the previously referenced application Ser. No. 11/671,220, filed Feb. 5, 2007, entitled "Web-based System Providing Royalty Processing and Reporting Services," the disclosure of which has been incorporated by reference. Given that context, the method 1200 proceeds as follows First, at step 1201, the method gathers any associated contracts—that is, contracts that are required to be cross-referenced for financial purposes (for the products identified in the sales data). Combined contracts will be organized so that they appear on a final statement financially grouped together. This is important to account for interdependent contract terms such as advances (i.e., where no payment is due until some amount of earnings has occurred) that may span multiple contracts. In this manner, the correct (combined) royalty may be determined and accurately reported to a recipient (payee).

The next step, at step 1202, is to process all the sales data, for the explicit purpose of determining whether royalties should be paid on those sales. Here, the method looks at each sales item (i.e., data record), skipping any that have already had their royalties paid. Note that the sales data itself is not necessarily confined to a defined period (e.g., last month). Instead, sales data may include any items that have been received or accumulated by the system, but for whatever reason has not had royalties paid. For each sales item identified to be processed, the method matches the corresponding contract(s) and, more specifically, contract terms that match the sale. For a given item, multiple contracts may be matched. For an Elton John sales item, for example, matching contracts could include ones for the artist (Elton John), the producer, and anyone else who is to be paid. Contracts themselves are attachable to track products and album products.

Now the method may iterate individual contract terms to see how the sales item is to actually be paid, as indicated by step 1203. The method looks at each term in the order that it is listed (e.g., via the UI). Here, the method matches the sales item against criteria of the contract terms. For example, a given contract term may specify a product type (e.g., CD, LP, digital download, or the like) and a region (e.g., US, Japan, etc.). For certain sales, the method examines the price level and sales channel (e.g., retail, military, etc.). In this manner, the method can match up attributes in the sales data with applicable contract terms.

If a contract term matches a sales item, then royalties are to be paid per that term. Pursuant to long-standing industry practice, there are two fundamental approaches to paying royalties: unit based royalties and net revenue-based royalties. The former simply takes a number of units (e.g., one million units sold) and applies a per unit royalty (e.g., based on wholesale or suggested retail price). The latter approach simply takes a net amount received (e.g., $7,000 received for Elton John CD sales) and applies a royalty rate (which may or may not be subject to reduction). The particular approach to be used for a given sales item (i.e., unit based or net revenue based) is indicated by the matching contract term. Like lines are lined up or accumulated. For example, a given sales item may generate a corresponding statement detail line. Upon encountering additional sales of that item (e.g., more units), the system may simply add it to that statement detail line. The sales items are iterated against the contract terms in this manner to generate the statement detail lines that are to be reported out. Note that no statement detail lines are generated for sells items that have no reportable royalties. In other words, only the products that actually sold and have reportable royalties will be reported out on statements.

Once the statement data has been aggregated in the manner described above, the method may proceed to generate appropriate royalty statements, as indicated at step 1204. The statement data is iterated to produce one or more actual statements. Statements themselves may be packaged for delivery, such as a PDF file or HTML file.

Mechanicals and Controlled Compositions

As the determination of publishing royalties or "mechanicals" occurs in an analogous manner to that described for method 1200, the following will focus mainly on the differences. Effectively, the system takes sales data and product information and determines what the applicable licenses are. Here, the approach is to take a sales item and find a corresponding license for it. The license dictates how publishing royalties are to be paid. However, because of the different ways that "mechanicals" may be paid, additional issues arise that must be handled. Publishing royalties may be paid using a license that applies a standard royalty (i.e., statutory rate) set by the US Copyright Office. Alternatively, publishing royalties may be paid using a formal (i.e., negotiated) license (typically based on the standard royalty that would be due). For additional detail, refer to the previous description of mechanical reproduction licenses ("mechanical" licenses) above. Given these different ways that publishing royalties may be paid, the system includes additional program logic for handling scenarios that may arise.

As the simplest case, a publishing royalty may be paid based on when a given sale occurs (i.e., based on actual sale date). This date is important as the underlying statutory rate is revised from time to time. Thus, the actual publishing royalty due may be a dynamic affair, if the license is pegged to the (ever changing) statutory rate. To accommodate this situation, the system maintains an internal table that reflects updates to the statutory rate that occur over time. More complex variations may occur, however, especially if terms more favorable than a compulsory license are negotiated. For example, a publishing royalty may be based on some discounted rate, such as some percentage of statutory rate (e.g., 75% of "stat"). Or, a publishing rate may be based, at least in part, on the length of the work. For instance, songs longer than five minutes may be paid at an enhanced statutory rate (e.g., one cent per additional minute). However, the licensee may negotiate this down, such that a licensed song is paid at "minimum statutory" rate, regardless of length.

Apart from being subject to publishing royalties under the statutory scheme, a work may instead be in the public domain. This is treated as a "public domain license" which has no royalties due (i.e., rate is equal to zero). This approach is particularly helpful for handling sales of public domain works that do not match up to an existing license, so that publishing royalties for those works are not carried forward as a liability (i.e., accrued royalty).

Another complexity of mechanical licenses occurs in the handing of a "controlled composition" clause. As previously described, these are geared towards singer/songwriter arrangements (e.g., Elton John). This type of clause typically works to the benefit of the payer, to set an upper limit on the amount of royalty paid. For example, a clause may establish that the maximum number of tracks that royalties will be paid for on a given album is equal to 10, notwithstanding the fact that 12 tracks may have been placed on the album by the artist. The approach to handling this type of calculation is to employ a "royalty pool." Say, for example, that the royalty rate per track is ten cents. For the foregoing album having a specified maximum of 10 royalty-bearing tracks, this creates a royalty pool of $1. Royalties are still paid at the individual track level but with the following difference. The royalty pool is divided over the total number of tracks. Therefore, for 12 tracks, the per-track rate is $1 divided by 12—that is, $0.083 royalty at the level of the track sale. This calculation may have to account for "outside" tracks (i.e., other than the singer/songwriter) that require payment of full royalties. Consider again the example of 12 tracks, but suppose two are outside tracks that are not controlled. In that case, the full royalty is paid for each outside track (i.e., ten cents a piece). This amount, twenty cents total, is used to reduce the royalty pool. Thus for this example, the remaining 10 tracks divide the remaining pool of eighty cents (i.e., $1.00-$0.20), giving a per track rate of eight cents (i.e., $0.80/10).

Views

In order to construct the views presented by the user interface of the present invention, additional database modeling is required beyond standard one-to-many linkages. Albums have tracks, but a given manifestation (e.g., CD versus LP) of an album product may not have all tracks. This problem is further compounded in the digital world where the particular tracks offered on a given album may change from one vendor to the next. Moreover, the tracks themselves are product as well. In accordance with the present invention, these complexities are handled as follows. A product table is used to track products. Each product table entry represents a particular manifestation of an album or a track. For representing a given album, it is necessary to specify which particular tracks comprise that album. This is done using a product track table, which represents the tracks that are used on a given physical product. Note particularly here that a given product contains a subset of album tracks, or even supersets in the case of bonus tracks. The digital world adds additional complexity since individual tracks can often be purchased separately. Thus, the tracks themselves become products, each being represented by an entry in the product table.

With this data model approach, temporary or "pseudo" products are easily accommodated. As mentioned, the particular tracks offered on a given album may in fact change from one online vendor to the next. For example, iTunes may offer an exclusive bonus track for an album. These additional tracks are flagged as bonus tracks in the system, and may be associated with their respective vendors (including setting time limits for track availability). It is important to model this information since the individual retailer (e.g., iTunes/Apple) will simply report that a particular album sold some amount during a given timeframe. Given such sales data input, the system implements a data model that tracks these complexities in order to correctly compute and report applicable royalty payments.

Source Code Implementation

Appended herewith is a source code appendix providing additional description of the preferred embodiment. The source code presented includes processor-executable program logic or instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). In the currently preferred embodiment, the source code is created using the Perl programming language. A development environment suitable for creating, editing, and compiling Perl source code is available from several sources, including Open Perl IDE (open source released under the Mozilla Public License).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A Web-based royalty system and user interface for tracking and managing albums and other digital works comprising:
    a first computer having at least one processor and a memory;
    a Web browser operating on said first computer;
    an album view interface, running in a graphical user interface hosted by the Web browser, having browser-rendered user input elements to manage a plurality of albums from the Web browser, said album view interface comprising:
        an album section listing general information about each album,
        an expandable, collapsible tracks section listing audio tracks that comprise each album, the tracks section providing, in response to user selection of a track, an expanded track entry view listing master sound recording data and song data for the selected track together with contracts associated with the selected track, said master sound recording data providing on-demand access to actual sound recordings that comprise the tracks, at least some of the contracts comprising contract terms specifying royalties applicable to the selected track, and wherein at least two of the contract terms overlap such that a conflict arises as to which contract terms shall apply to certain sales involving the selected track,
        a products section listing products that each album is sold under,
        a contracts section listing all underlying contracts associated with each album, the contracts section providing, in response to user input, on-demand access to an editable copy of a given contract that has been associated with an album and on-demand access to a prioritized listing of contract terms for the given contract having a user-assigned priority value for each contract term, so that when a conflict arises as to which of two or more overlapping contract terms should apply to a given sale, the contract term having the highest priority is applied, the prioritized listing also including a default contract term that is applied to any sale not otherwise governed by contract terms, and
        a track entry view providing on-demand access to underlying contracts associated with each user-selected track of interest;
    a revenue module running within the Web browser and having user input elements to input sales records for each product;
    a second computer having at least one processor and a memory, said second computer in communication with said first computer;
    a calculation engine operating on said second computer for calculating royalties due for the sales records inputted for each product, by matching each sales record with a given product listed in the product section, and determining for each matched product royalties due based on applying contract terms that are applicable to sales of that product, including resolving any conflicts that arise from overlapping contract terms using said user-assigned priority values assigned for the contract terms and applying default contract terms for sales not otherwise covered by a contract term; and
    a statement generator operating on said second computer for generating royalty reports of the calculated royalties for display to the user at the Web browser operating on said first computer.

2. The system of claim 1, wherein said contract terms include royalty terms applicable to digital works.

3. The system of claim 1, wherein the calculation engine calculates royalties at least based in part on the priority ranking assigned to each contract term.

4. The system of claim 3, wherein the priority ranking assigned to each contract term allows the calculation engine to correctly calculate royalties due for sales records potentially covered by more than one contract term.

5. The system of claim 3, wherein the calculation engine eventually applies a default term for a sales record not matching a contract term having a higher priority ranking.

6. The system of claim 1, wherein the contract terms comprise license terms for mechanical reproduction rights.

7. The system of claim 6, wherein the calculation engine calculates royalties based at least in part on any sales subject to a controlled composition clause.

8. The system of claim 1, wherein the sales records comprises sales records for digital content of music.

9. A Web-based method for processing royalties, the method embodied on first and second computers and comprising:

operating by the first computer a Web browser hosting a graphical user interface having an album view interface with browser-rendered user input elements to manage a plurality of albums, said album view interface comprising:

an album section listing general information about each album, an expandable, collapsible tracks section listing audio tracks that comprise each album, the tracks section providing, in response to user selection of a track, an expanded track entry view listing master sound recording data and song data for the selected track together with contracts associated with the selected track, said master sound recording data providing on-demand access to actual sound recordings that comprise the tracks, at least some of the contracts comprising contract terms specifying royalties applicable to the selected track, and wherein at least two of the contract terms overlap such that a conflict arises as to which contract terms shall apply to certain sales involving the selected track, a products section listing products that each album is sold under, a contracts section listing all underlying contracts associated with each album, the contracts section providing, in response to user input, on-demand access to an editable copy of a given contract that has been associated with an album and on-demand access to a prioritized listing of contract terms for the given contract having a user-assigned priority value for each contract term, so that when a conflict arises as to which of two or more overlapping contract terms should apply to a given sale, the contract term having the highest priority is applied, the prioritized listing also including a default contract term that is applied to any sale not otherwise governed by contract terms, and a track entry view providing on-demand access to underlying contracts associated with each user-selected track of interest;

operating at the Web browser of the first computer a revenue module having user input elements to input sales records for each product;

operating by the second computer a calculation engine for calculating royalties due for the sales records, by matching each sales record with a given product listed in the product section, and determining for each matched product royalties due based on applying contract terms that are applicable to sales of that product, including resolving any conflicts that arise from overlapping contract terms using said user-assigned priority values assigned for the contract terms and applying default contract terms for sales not otherwise covered by a contract term; and generating by the second computer royalty reports of the calculated royalties and transmitting said royalty reports back to the first computer for display to the user.

10. The method of claim 9, wherein said contract terms include royalty terms applicable to digital works.

11. The method of claim 9, further comprising:
assigning each contract term a priority ranking based on user input.

12. The method of claim 11, further comprising calculating royalties at least based in part on the priority ranking assigned to each contract term.

13. The method of claim 12, wherein the priority ranking assigned to each contract term allows the calculating engine to correctly calculate royalties due for sales records potentially covered by more than one contract term.

14. The method of claim 12, wherein calculating royalties further comprises:
applying a default term for a sales record not matching a contract term having a higher priority ranking.

15. The method of claim 9, wherein the contract terms comprise license terms for mechanical reproduction rights.

16. The method of claim 15, wherein the calculating engine calculates royalties based at least in part on any sales subject to a controlled composition clause.

17. The method of claim 9, wherein the sales records comprises sales records for digital content of music.

\* \* \* \* \*